(12) United States Patent
Pearcy et al.

(10) Patent No.: US 12,350,678 B2
(45) Date of Patent: Jul. 8, 2025

(54) REAGENT STORAGE DEVICES AND METHODS FOR SAME

(71) Applicant: Biolyph, LLC, Chaska, MN (US)

(72) Inventors: Timothy E. Pearcy, Eden Prairie, MN (US); Steve Rose, Minneapolis, MN (US)

(73) Assignee: BIOLYPH, LLC, Chaska, MN (US)

( * ) Notice: Subject to any disclaimer, the term of this patent is extended or adjusted under 35 U.S.C. 154(b) by 1098 days.

(21) Appl. No.: 17/250,356

(22) PCT Filed: Jul. 10, 2019

(86) PCT No.: PCT/US2019/041267
§ 371 (c)(1),
(2) Date: Jan. 8, 2021

(87) PCT Pub. No.: WO2020/014403
PCT Pub. Date: Jan. 16, 2020

(65) Prior Publication Data
US 2021/0138471 A1 May 13, 2021

Related U.S. Application Data

(60) Provisional application No. 62/696,287, filed on Jul. 10, 2018.

(51) Int. Cl.
*B01L 3/00* (2006.01)
*G01N 35/10* (2006.01)
*G01N 35/04* (2006.01)

(52) U.S. Cl.
CPC ............. *B01L 3/523* (2013.01); *B01L 3/527* (2013.01); *G01N 35/1002* (2013.01);
(Continued)

(58) Field of Classification Search
CPC .... B01L 3/523; B01L 3/527; B01L 2300/044; B01L 2300/0854; B01L 2300/105;
(Continued)

(56) References Cited

U.S. PATENT DOCUMENTS 5,985,218 A  11/1999  Goodale
7,731,903 B2  6/2010  Sattler et al.
(Continued)

FOREIGN PATENT DOCUMENTS

AU   2015234295       10/2015
AU   2022263524 B2    1/2025
(Continued)

OTHER PUBLICATIONS

"International Application Serial No. PCT/US2019/041267, International Search Report mailed Nov. 4, 2019", 4 pgs.
(Continued)

*Primary Examiner* — Jill A Warden
*Assistant Examiner* — Dwayne K Handy
(74) *Attorney, Agent, or Firm* — Schwegman Lundberg & Woessner, P.A.

(57) ABSTRACT

A reagent cartridge includes a cartridge body configured to store a solid reagent, the cartridge body having a reagent well accessible through an access port. A seal plate is proximate the access port, the seal plate extends away from the access port to a seal plate edge remote from the access port. The reagent cartridge includes an isolation envelope surrounding the reagent well. The isolation envelope includes a seal membrane covering the access port, at least one isolation wall, and at least one isolation cavity interposed between the isolation wall and the well sidewall. One or more reagent cartridges are received in a cartridge magazine. The cartridge magazine includes at least one comple-
(Continued)

mentary profile seat configured to receive the one or more reagent cartridges having a corresponding cartridge profile.

24 Claims, 17 Drawing Sheets

(52) U.S. Cl.
CPC . *B01L 2300/044* (2013.01); *B01L 2300/0829* (2013.01); *B01L 2300/0832* (2013.01); *G01N 2035/0403* (2013.01); *G01N 2035/0425* (2013.01); *G01N 2035/0436* (2013.01)

(58) Field of Classification Search
CPC ...... B01L 2200/025; G01N 2035/0403; G01N 2035/0436
See application file for complete search history.

(56) References Cited

U.S. PATENT DOCUMENTS

| | | | |
|---|---|---|---|
| 7,850,923 | B2 | 12/2010 | Byrd |
| 9,782,777 | B2 | 10/2017 | Mortillaro et al. |
| 2008/0093364 | A1 | 4/2008 | Nuotio et al. |
| 2008/0220481 | A1 | 9/2008 | Mortillaro et al. |
| 2014/0141409 | A1 | 5/2014 | Foley et al. |
| 2015/0135502 | A1 | 5/2015 | Rankin et al. |
| 2017/0259258 | A1 | 9/2017 | Buse et al. |

FOREIGN PATENT DOCUMENTS

| | | | |
|---|---|---|---|
| CA | 3106165 | A1 | 1/2020 |
| EP | 2644273 | | 10/2013 |
| EP | 3820611 | | 4/2022 |
| WO | 03020427 | | 3/2003 |
| WO | WO-2003020427 | A1 | 3/2003 |
| WO | 2007028861 | | 3/2007 |
| WO | 2012006185 | | 1/2012 |
| WO | 2016166765 | | 10/2016 |
| WO | WO-2020014403 | A1 | 1/2020 |

OTHER PUBLICATIONS

"International Application Serial No. PCT/US2019/041267, Invitation to Pay Additional Fees mailed Aug. 30, 2019", 2 pgs.
"International Application Serial No. PCT/US2019/041267, Written Opinion mailed Nov. 4, 2019", 5 pgs.
"International Application Serial No. PCT US2019 041267, International Preliminary Report on Patentability mailed Jan. 21, 2021", 7 pgs.
"European Application Serial No. 19833242.1, Response to Communication pursuant to Rules 161(2) and 162 EPC filed Sep. 3, 2021", 133 pgs.
"Australian Application Serial No. 2019301671, First Examination Report mailed Nov. 4, 2021", 3 pgs.
"Canadian Application Serial No. 3,106,165, Office Action mailed Dec. 2, 2021", 3 pgs.
"European Application Serial No. 19833242.1, Extended European Search Report mailed Mar. 7, 2022", 9 pgs.
"Canadian Application Serial No. 3,106,165, Response filed Apr. 1, 2022 to Office Action mailed Dec. 2, 2021", 119 pgs.
"Canadian Application Serial No. 3,106,165, Office Action mailed Jul. 13, 2022", 3 pgs.
"Australian Application Serial No. 2019301671, Response filed Sep. 16, 2022 to First Examination Report mailed Nov. 4, 2021", 41 pgs.
"Australian Application Serial No. 2019301671, Subsequent Examiners Report mailed Oct. 14, 2022", 3 pgs.
"Australian Application Serial No. 2019301671, Response filed Nov. 1, 2022 to Subsequent Examiners Report mailed Oct. 14, 2022", 24 pgs.
"Australian Application Serial No. 2022263524, First Examination Report mailed Oct. 6, 2023", 3 pgs.
"Australian Application Serial No. 2022263524, Response filed Aug. 22, 2024 to First Examination Report mailed Oct. 6, 2023", 24 pgs.
"Canadian Application Serial No. 3,226,075, Examiners Rule 86(2) Report mailed Jan. 30, 2025", 3 pgs.
"European Application Serial No. 19833242.1, Response filed Jan. 6, 2023 to Extended European Search Report mailed Mar. 7, 2022", 155 pgs.
"European Application Serial No. 19833242.1, Communication Pursuant to Article 94(3) EPC mailed Jan. 29, 2025", 5 pgs.

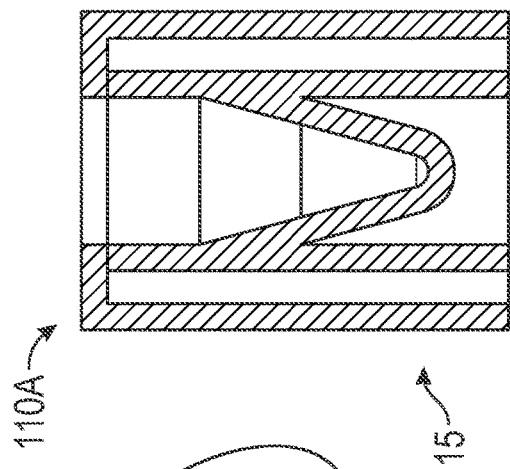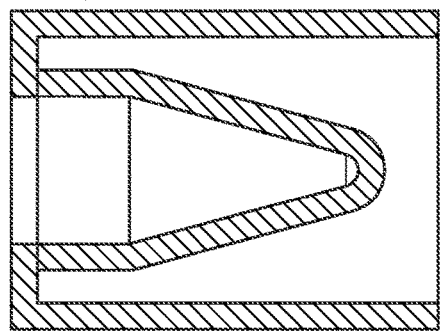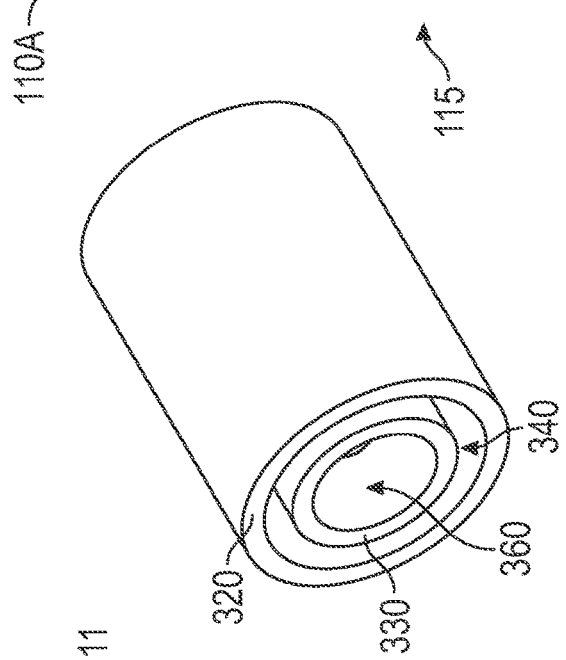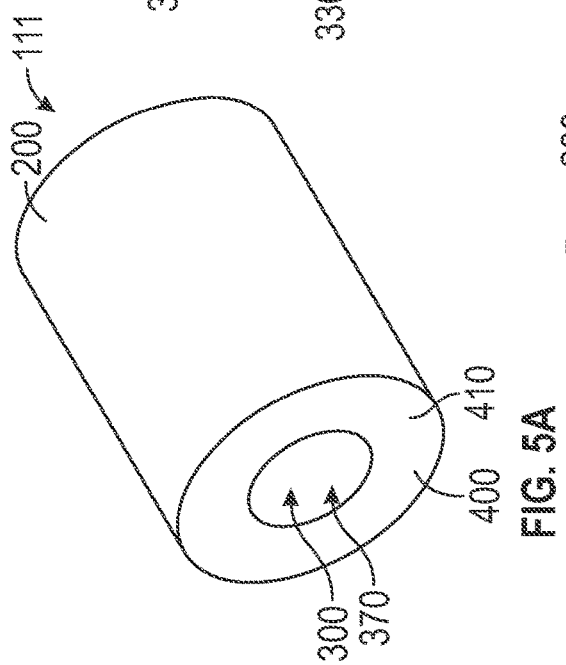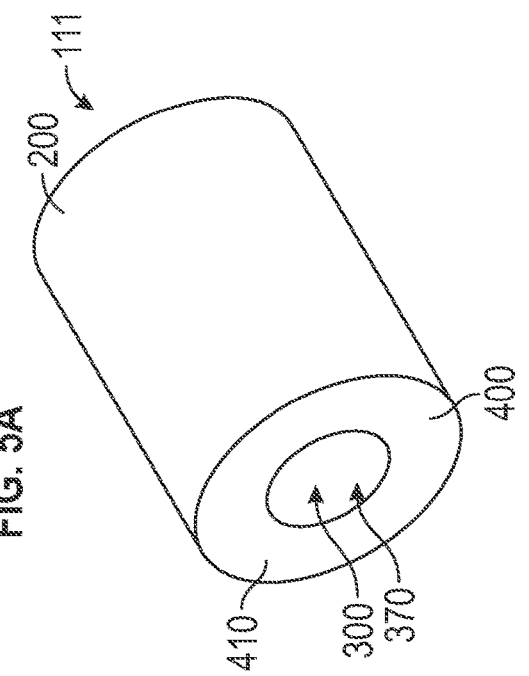

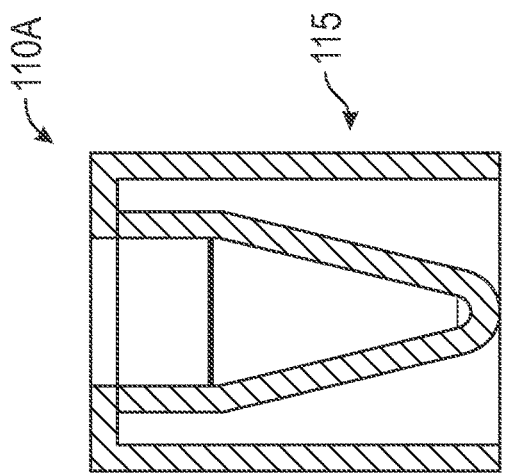
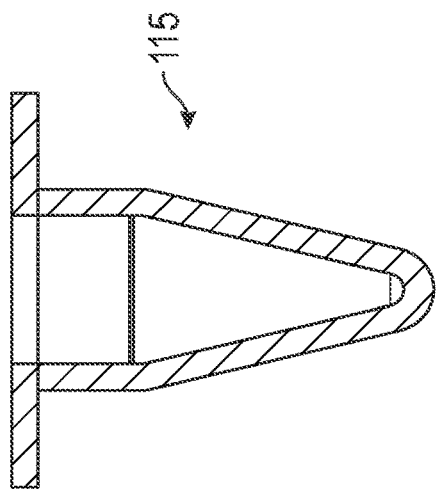
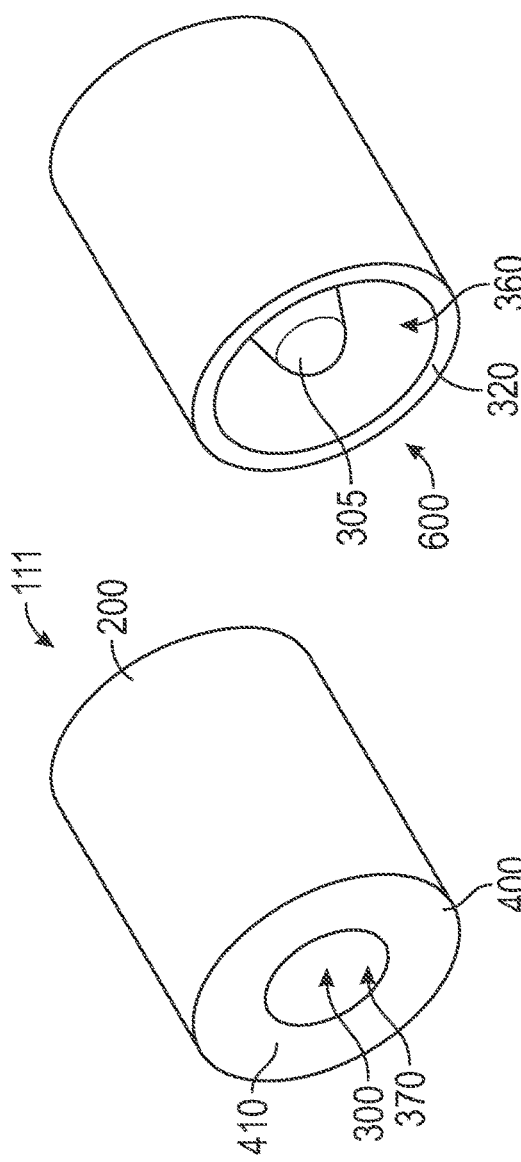
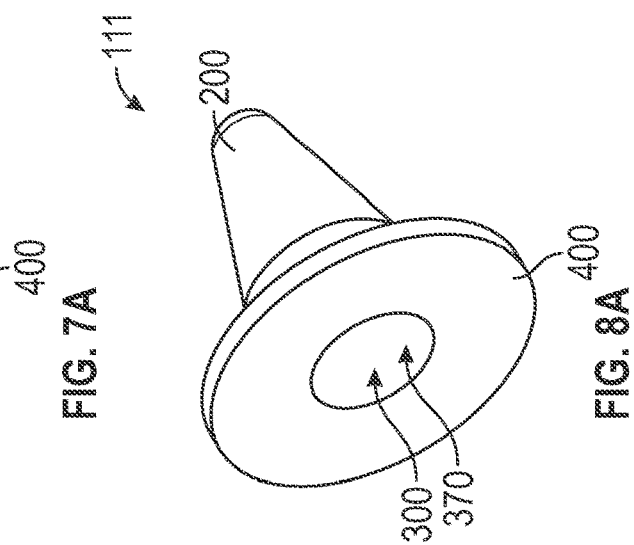

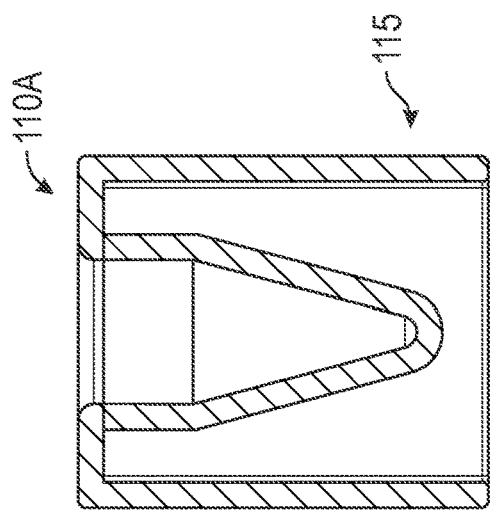
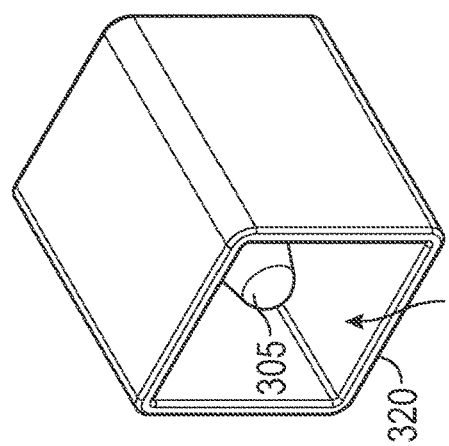
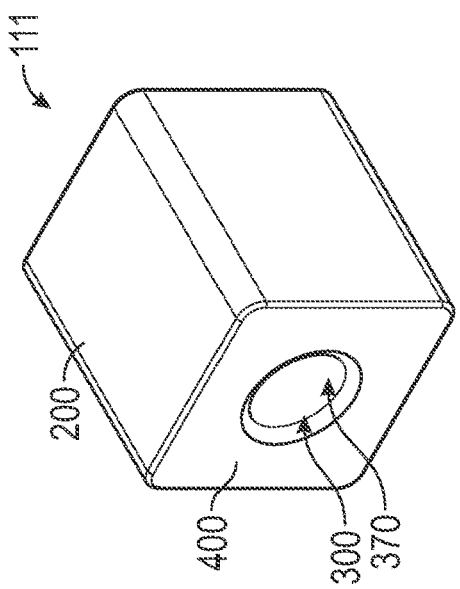

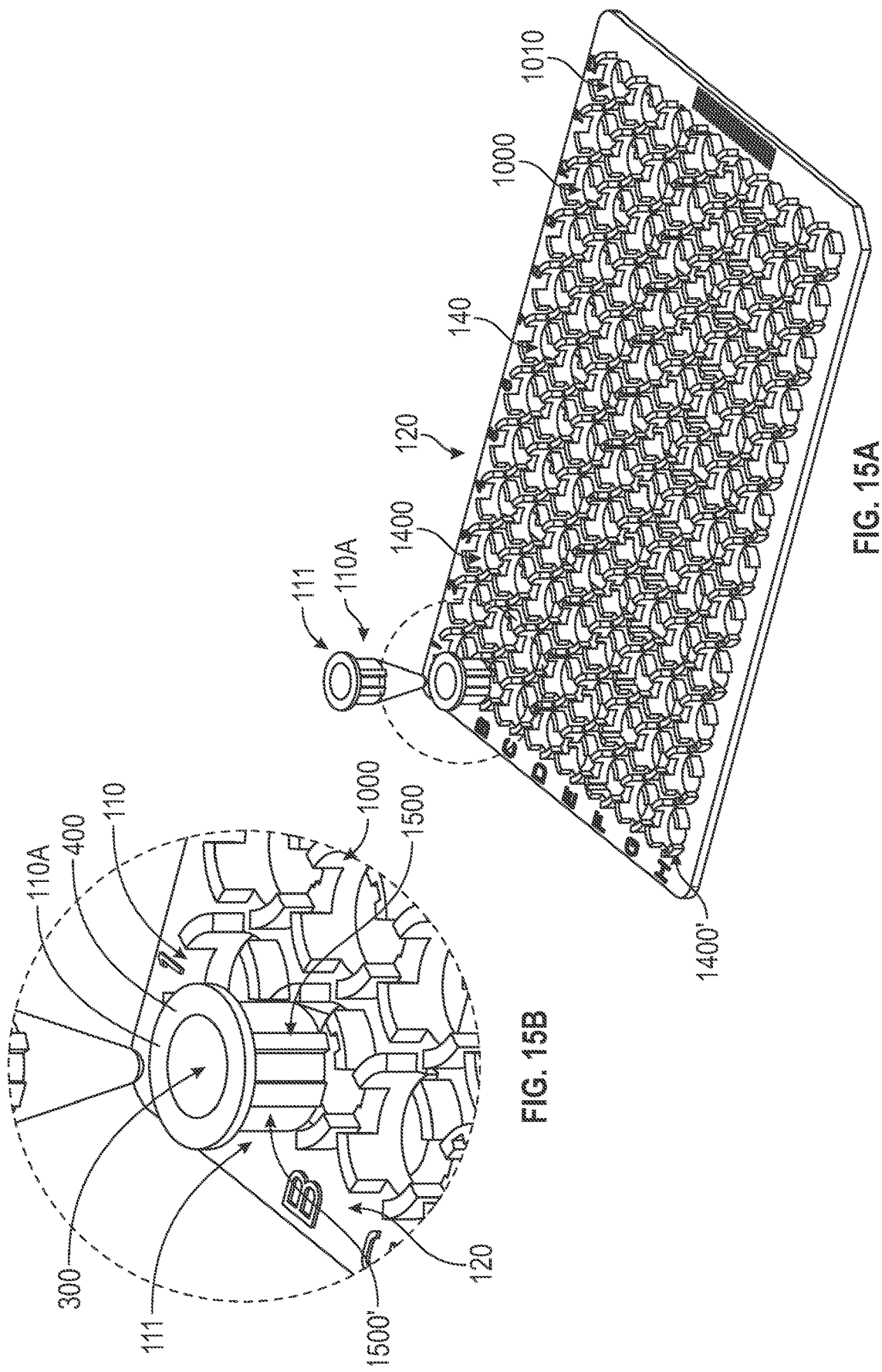

REAGENT STORAGE DEVICES AND METHODS FOR SAME

CLAIM FOR PRIORITY

This application is a U.S. National Stage Filing under 35 U.S.C. § 371 from International Application No. PCT/US2019/041267, filed on Jul. 10, 2019, and published as WO2020/014403 on Jan. 16, 2020, which claims the benefit of priority of U.S. Provisional Application No. 62/696,287, filed Jul. 10, 2018; the benefit of priority of each of which is hereby claimed herein, and which applications and publication are hereby incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the data as described below and in the drawings that form a part of this document: Copyright Biolyph, LLC, of Chaska, Minnesota. All Rights Reserved.

TECHNICAL FIELD

This document pertains generally, but not by way of limitation, to the storage, maintenance and dispensing of solid reagents including diagnostic reagents and medicaments.

BACKGROUND

In some examples diagnostic reagents (e.g., for testing and analysis, drug discovery or the like) require preparation prior to use. For instance, reagents may require introduction of a solution to a dry reagent for reconstitution at their point of use. The reconstituted reagents are used for a variety of diagnostic tests including blood tests, genetic testing, toxin screens, chemical agent screening, microorganism screening, viral screening or the like.

In one example, reagents are stored in glass vials or ampoules. The glass of the ampoule is closed around the reagent to isolate it from the exterior environment including moisture and other contaminants. In another example, reagents are stored in glass vials, and an impermeable membrane, such as aluminum foil, is applied across the vial opening to enclose the reagent.

In use, trays including a plurality of wells receive the reconstituted reagent in preparation for conducting diagnostic tests. The reconstituted reagent is withdrawn from a container (e.g., a beaker, reservoir or the like) and delivered to the wells. The sample or samples that are tested are administered to the wells, for instance with a multi-syringe tool.

Alternatively, the solid reagent is removed from a storage device, such as a glass vial or ampoule, handled by a clinician, deposited in the well by the clinician and reconstituted. The sample is administered to the well (or wells) including reconstituted reagents for testing.

OVERVIEW

The present inventors have recognized, among other things, that a problem to be solved includes providing multiple instances of a reagent or multiple various reagents in a storage system that provides easy access for reconstitution and testing, minimizes manipulation (e.g., from packaging to a tray, tube or the like), and reliably stores the reagent for long shelf times without a decrease to efficacy, and does so in a cost effective manner (i.e., without glass). Glass vials and ampoules provide reliable isolation for a solid reagent. However, glass is an expensive material, is prone to breakage, and depending on the method for opening the vial or ampoule generates waste (e.g., glass shards). These issues are further aggravated with reagents that are stored in large quantities, used with frequency or the like (e.g., for drug testing, viral testing or the like). Additionally, glass vials and ampoules generally have a consistent cylindrical profile because of glass forming and manufacturing techniques.

The present subject matter helps provide a solution to this problem, such as by reagent cartridges that include solid reagents ready for reconstitution therein. The reagent is stored in a reagent well, and surrounded by a well sidewall that minimizes (e.g., minimizes or eliminates) moisture and vapor penetration. The reagent cartridge provides an isolation envelope that minimizes the ingress of moisture to the reagent, and thereby maintains the reagent for long periods of time without loss of efficacy. Optionally, the reagent cartridge is constructed with a polymer, such as cyclic olefin copolymer (COC) and is configured to minimize moisture penetration (e.g., with a wall thickness of 0.8 millimeters, 1.0 mm, 1.2 mm or greater). The isolation envelope includes one or more isolation walls, one or more intervening isolation cavities, desiccant within the isolation cavities, seal membranes (e.g., foil) to enclose the reagent well, isolation membranes (e.g., foil), seal plates or the like to fasten the membranes to the cartridge. These features of the isolation envelope enclose the one or more isolation cavities. Each of the features of the isolation envelopes provides a nested interposing barrier or buffer, between the exterior environment and the stored solid reagent. Incidental moisture that penetrates the material of the reagent cartridge is directed through each of these intervening features to substantially arrest ingress to the reagent.

The reagent cartridges described here are configured for loading in magazines for organized storage, and ready use (e.g., as in a 12×8 well plate frame) with existing diagnostic tools, such as aspiration or dispensing manifolds. The magazines are provided in configurations usable with existing lab equipment to facilitate easy use by clinicians. Further, the modular character of the cartridges and magazines allows for the loading of cartridges having various reagents in particular locations (e.g., locations A1, D10, of well plates or the like) based on the needs of the clinician or tests (e.g., for a battery of tests with a common sample fluid). Optionally, the cartridges and magazines are keyed with complementary profiles to ensure the installation of cartridges in corresponding magazines, or alternatively at corresponding locations in magazines (e.g., a zone of a 12×8 well plate magazine).

The present inventors have recognized, among other things, that a problem to be solved includes providing multiple instances of a reagent or multiple various reagents in a storage system that provides on-demand access to reagents, including reagents that are needed in small quantities (e.g., obscure tests) and other reagents that are repeatedly used (drug testing, hormone testing or the like) while minimizing the reconstitution of large (unused) quantities of the reagent that are then discarded, for instance after the efficacy of the reagent decreases.

The present subject matter helps provide a solution to this problem, such as by a reagent storage assemblies including a cartridge magazine loaded with a plurality of cartridges. In one example, each of the reagent cartridges provides a single or small number of uses of the solid reagent (i.e., 1, 2 or another small number reagent aliquots). In some examples, the magazines include a plurality of cartridges (e.g., each having a specified quantity of reagent, such as a single use) that are used in an on-demand fashion to preclude the waste of liquid reagents (e.g., from reservoirs of a reagent, or expensive and unstable smaller quantities of a reagent).

The long term storage provided with cartridge magazines and reagent cartridges loaded with reagents ensures testing systems are provided with a large catalog of reagents that are ready for immediate use, while at the same time minimizing storage and waste of large quantities of liquid reagents. For instance, a magazine is loaded with dozens or hundreds of cartridges each including a single use of a lyophilized reagent. The cartridge magazine is coupled with and used by the testing system to dispense reagent cartridges as needed (e.g., for typical blood tests). Accordingly, large reservoirs of liquid reagent are not maintained, and the solid reagent, even in large quantities, is reliably stored until needed. In other examples, a magazine is loaded with a relatively small quantity of reagent used for an obscure diagnostic test. In this example, the reagent is stored at the testing assembly and ready for immediate use when needed. Time consuming mailing, courier delivery or the like to offsite labs having the reagent for the obscure test on-hand are minimized while ensuring immediate local access to the diagnostic test because the magazine retains the reagent onboard the testing assembly.

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5A is a first perspective view of one example of a reagent cartridge.

FIG. 5B is a second perspective view of the reagent cartridge of FIG. 5A.

FIG. 5C is a cross sectional view of the reagent cartridge of FIG. 5A.

FIG. 6A is a first perspective view of another example of a reagent cartridge.

FIG. 6B is a second perspective view of the reagent cartridge of FIG. 6A.

FIG. 6C is a cross sectional view of the reagent cartridge of FIG. 6A.

FIG. 7A is a first perspective view of an additional example of a reagent cartridge.

FIG. 7B is a second perspective view of the reagent cartridge of FIG. 7A.

FIG. 7C is a cross sectional view of the reagent cartridge of FIG. 7A.

FIG. 8A is a first perspective view of an additional example of a reagent cartridge.

FIG. 8B is a second perspective view of the reagent cartridge of FIG. 8A.

FIG. 8C is a cross sectional view of the reagent cartridge of FIG. 8A.

FIG. 9A is a first perspective view of still another example of a reagent cartridge.

FIG. 9B is a second perspective view of the reagent cartridge of FIG. 9A.

FIG. 9C is a cross sectional view of the reagent cartridge of FIG. 9A.

FIG. 15A is a perspective view of the cartridge magazine of FIG. 14A with an example reagent cartridge having a cartridge profile.

FIG. 15B is a detailed perspective view of the cartridge magazine of FIG. 15A showing the reagent cartridge profile corresponding with the complementary profile seat.

DETAILED DESCRIPTION

Figure 1:
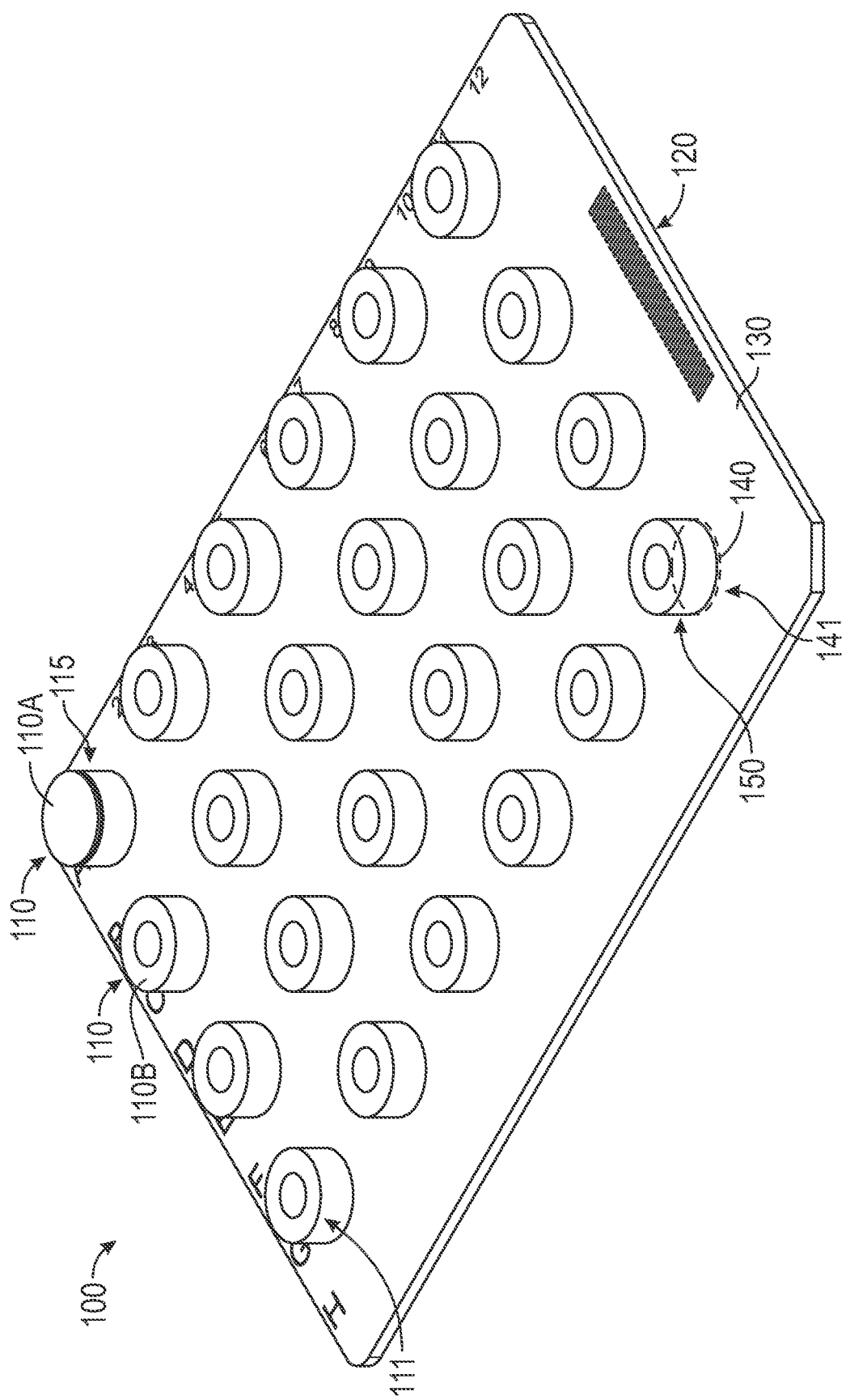
FIG. 1 is a perspective view of one example of a reagent storage assembly including a plurality of reagent cartridges.

FIG. 1 is a perspective view of one example of a reagent storage assembly 100 including a plurality of reagent cartridges 110. The reagent cartridges 110 optionally store (e.g., contain, hold, present, stow, accommodate, receive, or the like) a reagent, such as a diagnostic reagent. In an example, the reagent cartridges 110 includes a first reagent cartridge 110A and a second reagent cartridge 110B. The cartridge 110A stores a first reagent (e.g., for a first diagnostic test, such as a blood test) and the cartridge 110B stores a second reagent (e.g., for a second diagnostic test, such as a viral test). Accordingly, the reagent storage assembly 110A optionally includes cartridges 110 that store multiple instances of a reagent or multiple various reagents.

The cartridges 110 include an isolation envelope 115. The reagent cartridges are in one example constructed with polymers and subject to moisture permeation over time. The isolation envelope 115 is provided with each reagent cartridge 110 to isolate reagents therein (e.g., lyophilized or solid reagents). Accordingly, the reagents are reliably stored for long periods of time (shelf lives of months or years) while minimizing moisture penetration even with a polymer construction.

The reagent storage assembly 110 optionally includes a cartridge magazine 120. In some examples, the cartridge magazine 120 receives the reagent cartridges 110. For example, the cartridge magazine 120 includes a magazine body 130 (e.g., a well plate, box container with port or the like), and the magazine body 130 optionally defines at least one well socket 140. In an example, individual ones of the cartridges 110 (e.g., cartridge 110A) are received in the well socket 140. For instance, the cartridges 110 include a cartridge profile 111 (e.g., one or more of shape, size, dimensions, contour, perimeter, outline, or the like). The well socket 140 includes a socket profile 141 that is complementary to the cartridge profile. In some examples, the cartridge profile is coupled with the complementary profile of the well socket 140, for instance when individual ones of the cartridges 110 are received by the well socket 140.

In some examples, the cartridge magazine 120 includes a well seat 150. The well seat 150 includes the portion of the magazine body 130 that extends around the well socket 140. As described in greater detail herein the well seat 150 optionally provides a complementary profile seat to the cartridge profile of one or more of the reagent cartridges 110. For instance, the cartridges 110 include a specified profile (and optionally a corresponding specified reagent), and the cartridges 110 couple with complementary profile seats of the cartridge magazine 120 to facilitate organized and reliable installation of reagents (stored in the cartridges 110) to specified locations of the cartridge magazine 120.

Figure 2:
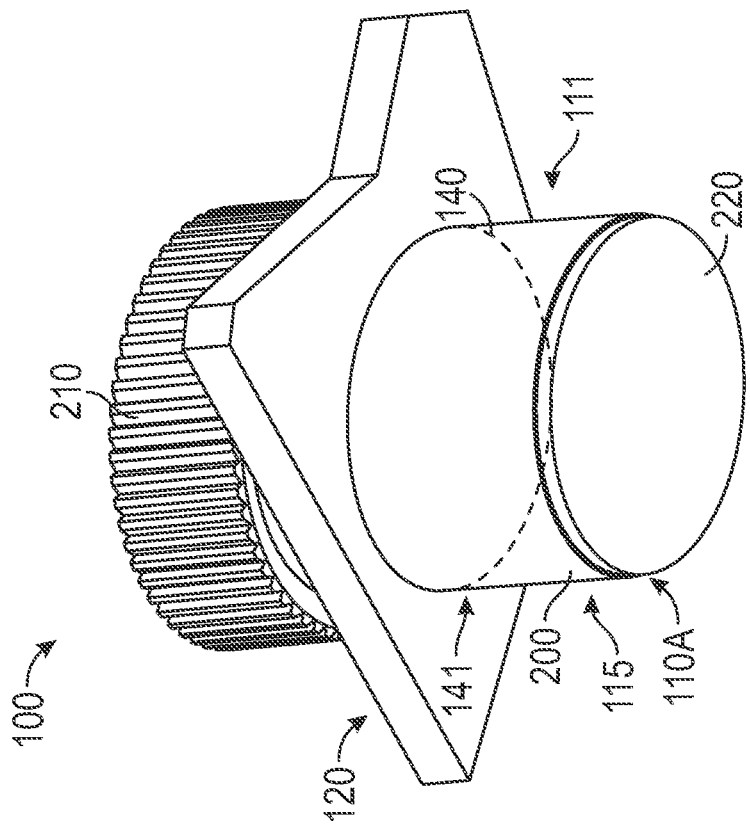
FIG. 2 is a perspective view of an example reagent cartridge coupled with a portion of a cartridge magazine.

FIG. 2 is a perspective view of an example reagent cartridge 110A coupled with a portion of a cartridge magazine 200. As described herein, individual cartridges 110A are optionally received by the well socket 140. As shown in FIG. 2, the socket profile 141 of well socket 140 (e.g., of the surrounding well seat 150) is complimentary to the cartridge profile 111 of the cartridges 110. Accordingly, the reagent cartridge 110A is received in the well socket 140 along the complementary well seat 150.

As described herein, the cartridges 110 (e.g., the cartridge 110A) include the isolation envelope 115 to isolate the reagent (or reagents) stored within the cartridges 110. For instance, the reagent is stored within a cartridge body 200 of the cartridge 110A. The cartridge body 200 is included in the isolation envelope 115. A cartridge cap 210 is in one example included in the reagent storage assembly 100. For example, the cap 210 is coupled with the cartridge body 200 and enhances the security of the isolation envelope 115, for instance by reducing the diffusion, permeation, intrusion or the like of the surrounding environment through the isolation envelope 115. In some examples, an isolation membrane 220 is coupled with the cartridge body 200 to enhance the security of the isolation envelope 115.

Figure 3:
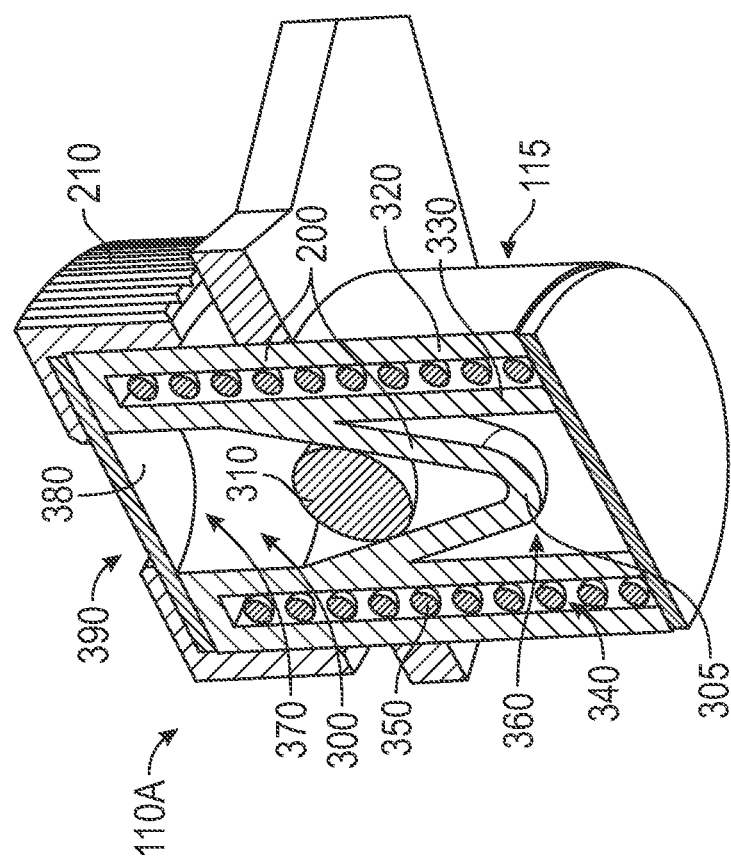
FIG. 3 is a cross sectional view of the reagent cartridge of FIG. 2.

FIG. 3 is a cross sectional view of the reagent cartridge 110A of FIG. 2. The cartridge body 200 defines a reagent well 300, and the reagent well 300 is sized and shaped to store reagent 310 (e.g., a lyophilized reagent) within the reagent well 300. The reagent well 300 is optionally tapered to ensure reconstituted reagent 310 is centrally located for full evacuation of the reagent (e.g., with a pipette) from the reagent well 300 (and the cartridge 110A). The reagent 310 is optionally a lyophilized reagent having a specified quantity of the reagent 310 that, when reconstituted, forms a specified volume of the reagent 310.

In an example, the cartridge body 200 includes a first isolation wall 320. The first isolation wall 320 may define a portion of the cartridge profile (e.g., the first isolation wall 320 optionally defines an exterior surface of the cartridge 110A). In another example, the cartridge body 200 includes a second isolation wall 330. In some examples, the isolation wall 330 defines a portion of the reagent well 300.

In some examples, the reagent cartridge 110A includes a first isolation cavity 340 interposed (e.g., located, positioned, sandwiched, or the like) between the first isolation wall 320 and the second isolation wall 330. Accordingly, the first isolation wall 320 is spaced apart from the second isolation wall 330. The reagent well 300 is nested within the first isolation wall 320, and the reagent well 300 is nested within the first isolation cavity 340. In some examples, the reagent well 300 is nested within each of the isolation walls 320, 300 and the isolation cavities 340 and 360 (surrounding a lower portion of the well sidewall 305). A desiccant 350 is optionally provided in the isolation cavity 330, for example to enhance the security of the isolation envelope 115 (and to isolate the reagent well 300) relative to moisture or vapor ingression.

The reagent cartridge 110A optionally includes a second isolation cavity 360. The second isolation cavity 360 is separated from the first isolation cavity 340, for instance by the second isolation wall 330. In an example, the cartridge 110A includes a well sidewall 305 that defines a portion of the reagent well 300, for example the well sidewall 305 surrounds the reagent well 300 and thereby defines the reagent well 300. The well sidewall 305 is optionally tapered, for example to centrally locate the reagent 310 within the reagent well 300. The well sidewall 305 separates the reagent well 300 from the isolation cavities 340, 360.

In an example, the isolation membrane 220 encloses one or more of the first isolation cavity 340 or the second isolation cavity 360, for instance to enhance the security of the isolation envelope 115. The isolation membrane 220 optionally encloses the desiccant 350 within the first isolation cavity 340 or within the second isolation cavity 360. The isolation membrane 220 includes, but is not limited to, foil seals, hydrophobic seals, composite seals or the like. The isolation membrane 220 cooperates with the isolation walls 320, 330 to separate each of the isolation cavities 340, 360 and isolates the reagent well 300 (and the reagent 310) further from the exterior environment. Accordingly, the various membranes, walls, cavities, desiccants or the like described herein provide a tiered or nested series of barriers or obstacles to minimize (e.g., slow, prevent, minimize) the ingress of moisture or vapor to the reagent 310.

The cartridge 110A includes an access port 370, and the access port 370 is in communication with the reagent well 300. For example, the cartridge body 200 defines the access port 370 and the access port 370 provides access to the reagent well 300. In an example, the access port 370 allows for administration (e.g., injection, placement, deposition, or the like) of the reagent 310 into the reagent well 300. In other examples, the access port 370 allows for evacuation (e.g., withdrawal, removal, suction, or the like) of the reagent 310 from the reagent well 300.

In an example, the cartridge 110A includes a seal membrane 380, and the seal membrane 380 covers the access port 370 to enhance the security of the isolation envelope 115. The seal membrane 380 reduces the diffusion, permeation, intrusion of moisture and contaminants from the surrounding environment to the reagent 310. Additionally, the seal membrane 380 inhibits the evacuation of the reagent 310 from the reagent well 300, for instance by sealing the reagent well 300.

In an example, the cap 210 is coupled with the cartridge body 200, and the cap 210 defines an access orifice 390. The access orifice 390 extends through the cap 210, and facilitates penetration of the seal membrane 280 (e.g., with a pipette) to allow for reconstitution and evacuation of the reagent 310 from the reagent well 300. For example, the access orifice 390 is aligned with the access port 370, and penetration of the seal membrane 280 allows the access port 370 to communicate with the access orifice 390. Accordingly, the access orifice 390 allows for evacuation of the reagent 310 from the reagent well 300.

Figure 4:
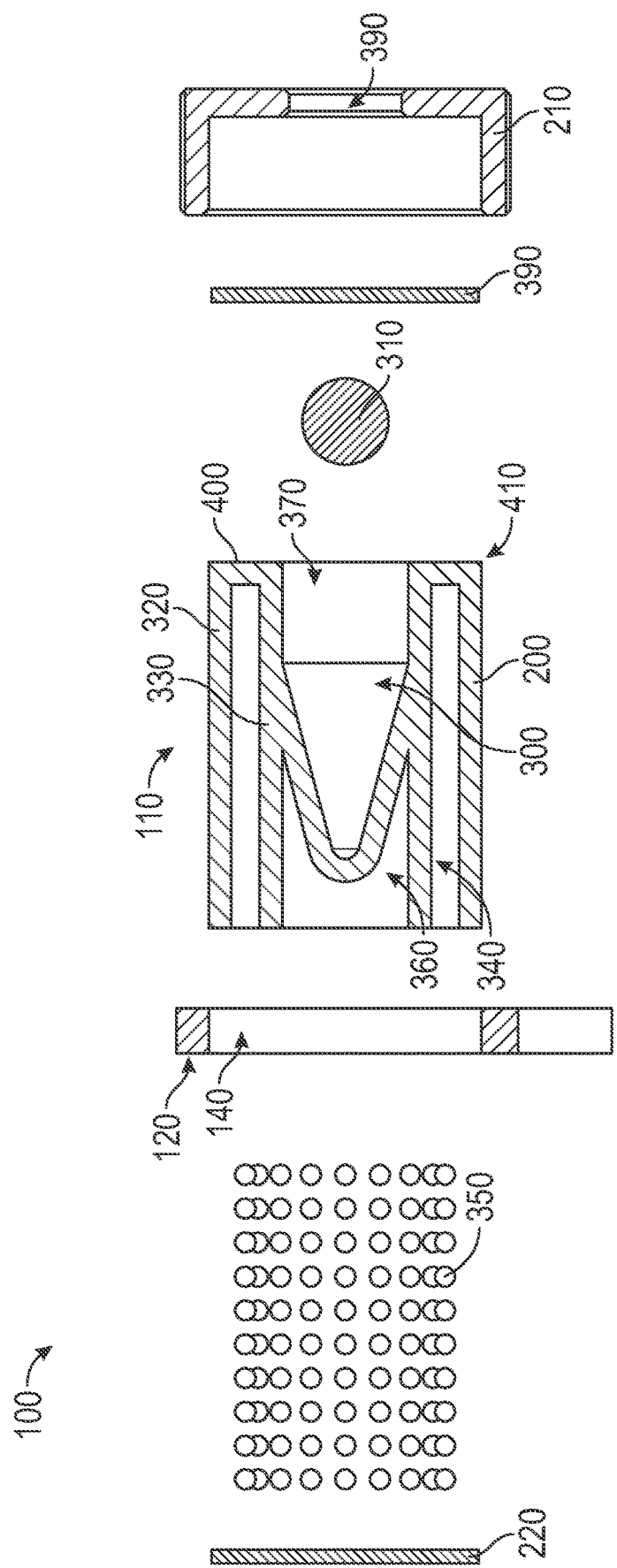
FIG. 4 is an exploded cross sectional view of the reagent cartridge of FIG. 2.

FIG. 4 is an exploded cross sectional view of the reagent cartridge 110A of FIG. 2. As described herein, the reagent cartridge 110A stores the reagent 210, for instance within the reagent well 300. Desiccant is optionally included in the isolation cavities 340, 360, and the isolation membrane 220 cooperates with the isolation walls 320, 330 to separate each of the isolation cavities 340, 360 and isolates the reagent well 300 further from the exterior environment (e.g., a lab, refrigerator, magazine, storage assembly, storage and handling system, or the like). The seal membrane 380 covers the access port 370. The reagent cartridge 110A is optionally received in the well socket 140 of the cartridge magazine 120, the well seat 150 surrounding the well socket 140 having a complementary profile.

In an example, the cartridge 110A includes a seal plate 400, and the seal plate 400 extends from the access port 370 to plate edges 410, for instance to provide an enlarged shelf for robust coupling between the seal membrane 380 and the cartridge body 200. In some examples, an area of the seal plate 400 is greater than an area of the access port 370.

The cartridge cap 210 is optionally coupled with the cartridge body 200 and enhances the security of the seal membrane 380 with the seal plate 400. For example, the cartridge cap 210 is coupled over the seal plate 400 and the seal membrane 380 and retains the seal membrane 380 therebetween. In some examples, the cap 210 provides an access orifice to facilitate penetration of the seal without removal of the cap. In one example, the cap 210 is threadingly engaged with the cartridge body 200 to couple the cap 210 with the body 200.

As described herein, the isolation envelope 115 isolates the reagent 310 stored within the reagent well 300. For example, the isolation envelope surrounds the reagent well 300. The isolation envelope 115 includes, but is not limited to, the isolation membrane 220, the seal membrane 380, the seal plate 400, one or more of the isolation walls 320 interposed between the reagent well 300 and the exterior environment, one or more of the isolation cavities 340, 360 between the isolation walls 320, 330 and the reagent well 300, desiccants 350 in the isolation cavities or the like. The isolation envelope 115 surrounds the reagent well 300 (e.g., partially or fully), for example to provide one or more intervening buffers to intercept and retard the penetration of matter (e.g., moisture, gases, liquids, solids, or the like) from the exterior environment to the reagent well 300 and reagent 310 therein. Accordingly, the various membranes, walls, cavities, desiccants or the like described herein provide a tiered or nested series of barriers or obstacles to minimize (e.g., slow, prevent, minimize) the ingress of matter (e.g., moisture, vapor, or the like) to the reagent 310.

FIGS. 5A-5C are perspective views and a cross sectional view of one example of the reagent cartridge 110A. As described herein, in some examples the cartridge 110A includes the isolation 115 envelope 115, the cartridge body 200, the reagent well 300, well sidewall 305, the isolation walls 320, 330, the isolation cavities 340, 360, the access port 370, the seal plate 400, and the plate edges 410. The cartridge 110A includes the cartridge profile 111, and the cartridge profile includes one or more of the shape, size, dimensions contour, perimeter, outline, or the like of the reagent cartridge 110A, including the cartridge body 200. In one example, cartridge magazines 120 having a complementary profile are configured to receive reagent cartridges 110 having a corresponding cartridge profile.

The cartridges 110 have a plurality of cartridge profiles 111. For example, the cartridge profile of the cartridge 110A shown in FIGS. 5A-5C is circular, and includes the first isolation wall 320 and the second isolation wall 330. The isolations walls 320, 320 are optionally arranged to be concentric.

FIGS. 6A-6C are perspective views and a cross sectional view of another example of the reagent cartridge 110A. As described herein, in some examples the cartridge 110A includes the isolation 115 envelope 115, the cartridge body 200, the reagent well 300, well sidewall 305, the isolation wall 320, the isolation cavity 360, the access port 370, the seal plate 400, and the plate edges 410.

The cartridges 110 have a plurality of cartridge profiles 111. For example, the cartridge profile 111 of the cartridge 110A shown in FIGS. 6A-6C is circular, and includes the first isolation wall 320. The well sidewall 305 is recessed with respect to the first isolation wall 320. For example, the well sidewall 305 is recessed within the isolation cavity 360 and is remote from an end 600 of the first isolation wall 320.

FIGS. 7A-7C are perspective views and a cross sectional view of an additional example of the reagent cartridge 110A. As described herein, in some examples the cartridge 110A includes the isolation 115 envelope 115, the cartridge body 200, the reagent well 300, well sidewall 305, the isolation wall 320, the isolation cavity 360, the access port 370, the seal plate 400, and the plate edges 410.

The cartridges 110 have a plurality of cartridge profiles 111. For example, the cartridge profile 111 of the cartridge 110A shown in FIGS. 7A-7C is circular, and includes the first isolation wall 320. The well sidewall 305 is not recessed with respect to the first isolation wall 320. For example, the well sidewall 305 is proximate to the end 600 of the first isolation wall 320. Accordingly, the shape, size, dimensions, or the like of the cartridges 110 are modified to provide the plurality of cartridge profiles. For instance, the cartridge profile shown in FIGS. 7A-7C are circular, however the present subject matter is not so limited. For instance, the cartridge profile optionally includes square, rectangular, triangular, annular, polygonal, or irregularly-shaped profiles.

FIGS. 8A-8C are perspective views and a cross sectional view of yet another of the reagent cartridge 110A. As described herein, in some examples the cartridge 110A includes the isolation 115 envelope 115, the cartridge body 200, the reagent well 300, well sidewall 305, the access port 370, the seal plate 400, and the plate edges 410. The cartridges 110 have a plurality of cartridge profiles 111. For example, the cartridge profile 111 of the cartridge 110A shown in FIGS. 8A-8C does not include the isolation walls 320, 330 or the isolation cavities 340, 360.

FIGS. 9A-9C are perspective views and a cross sectional view of one example of the reagent cartridge 110A. As described herein, in some examples the cartridge 110A includes the isolation 115 envelope 115, the cartridge body 200, the reagent well 300, well sidewall 305, the isolation wall 320, the isolation cavity 360, the access port 370, the seal plate 400, and the plate edges 410.

The cartridges 110 have a plurality of cartridge profiles 111. For example, the cartridge profile 111 of the cartridge 110A shown in FIGS. 9A-9C is rectangular, and includes the first isolation wall 320. The well sidewall 305 is recessed with respect to the first isolation wall 320. For example, the well sidewall 305 is recessed within the isolation cavity 360 and is remote from an end 600 of the first isolation wall 320.

Figure 10A:
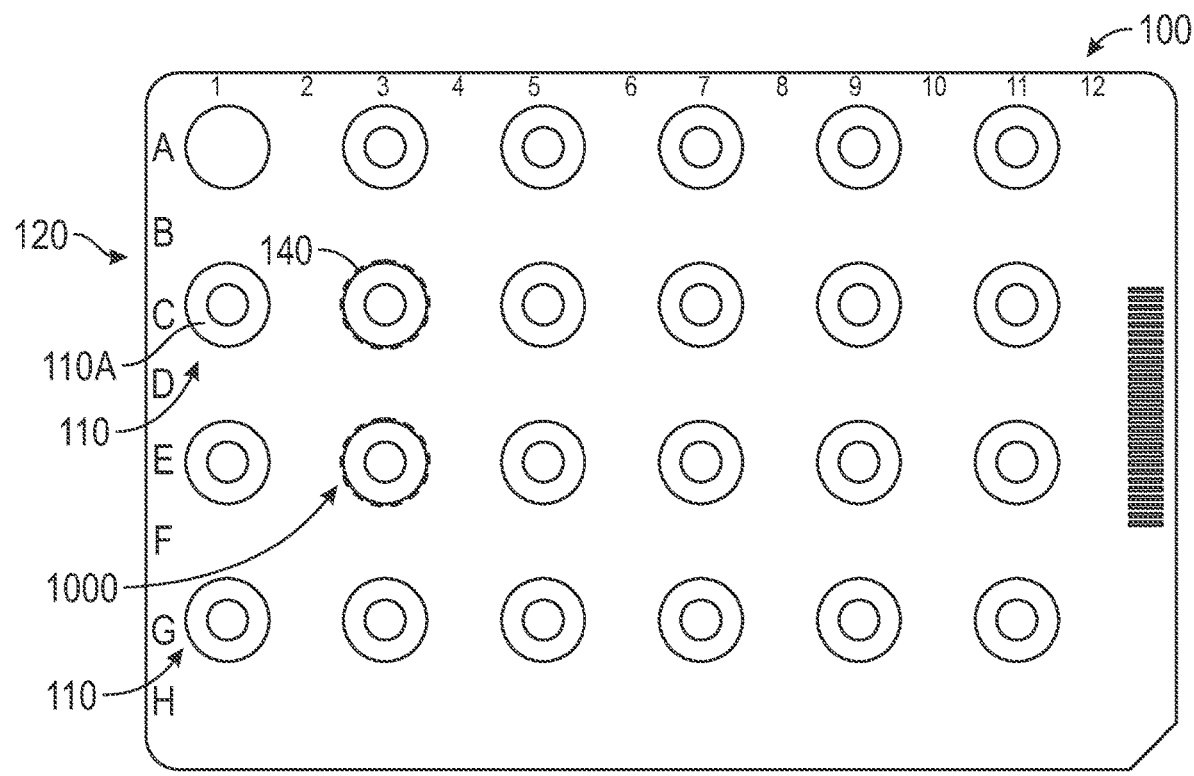
FIG. 10A is a top view of another example of a reagent storage assembly including a plurality of reagent cartridges.
Figure 10B:
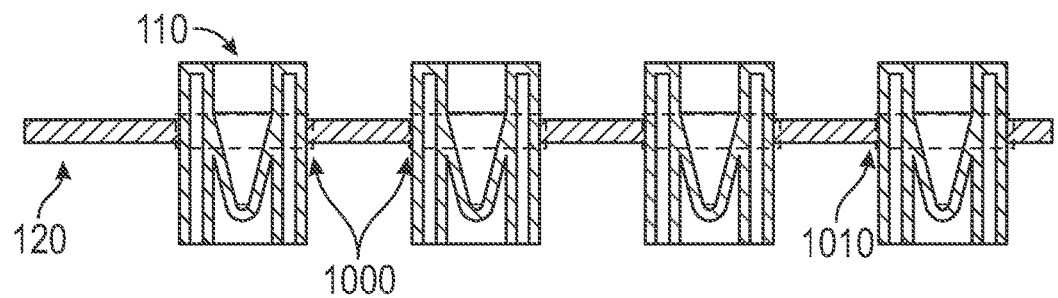
FIG. 10B is a cross sectional view of the reagent storage assembly of FIG. 10A.

FIGS. 10A and 10B are respectively a top view and a cross sectional view of another example of the reagent storage assembly 100 including the plurality of reagent cartridges 110. As described herein, the assembly 100 optionally includes a cartridge magazine 120. In some examples, the cartridge 110 includes a cartridge profile 111 that corresponds to at least one complementary profile seat of the cartridge magazine 120. The complementary profile seat 1000 allows the cartridge profile 111 to seat into the seat profile. Accordingly, the cartridges 110 include a cartridge profile 111 that corresponds to at least one complementary profile seat 1000 of the cartridge magazine 120.

In an example, the complementary profile seat 1000 encloses the well socket 140, and the cartridge 110A is optionally retained within the well socket 140. For example, the complementary profile seat retains the reagent cartridge 110A in the well socket 140 with one or more anchor fittings including, but not limited to, interference fit, detent and recess, groove and projection, threaded fitting or the like. Accordingly, the complementary profile seat and cartridge profile facilitate the retention of the cartridge 110A within the well socket 140.

In other examples, the complementary profile seat includes one or more differing profiles (e.g., such as indexing features including, but not limited to, socket shapes, grooves and ridges or the like). In some examples, the cartridge magazine 120 includes a plurality of well sockets 1010, and the well sockets 1010 accordingly receive reagent cartridges 110 having a corresponding cartridge profile that matches the complementary profile of the seats 1000 surrounding the sockets 1010. Accordingly, only specified reagents in specified cartridges 110 are seated in well sockets 1010 designated for the reagent. The cartridge magazine 120 is thereby readily organized during installation of the cartridges 110 to position cartridges 110 with the designated reagents in corresponding specified locations within the cartridge magazine 120.

The cartridge magazine 120 shown in FIG. 10A has a 4 by 6 configuration, and accordingly has 24 locations that receive cartridges 110. Other cartridge magazine 120 configurations include, but are not limited to, an 8×12 configuration, a 6×8 configuration, or the like. In another example, the well sockets 1010 are arranged in array (e.g., grid, lattice, net, or the like). For example, the well sockets 1010 are optionally provided in an array having a repeating pattern, such as a grid, groupings of like profiled complementary profile seats or the like. In another example, each well socket 140 (e.g., the well socket 140 shown at location A1, E9 or the like in the cartridge magazine 120) includes one or more indexing features as described herein. The indexing features in combination with the arrayed well sockets 1010 ensures reagents are installed in specified locations or zones of the cartridge magazine 120. For instance, specified reagent cartridges 110 having a specified reagent are installed in corresponding complementary profile seats 1000 of the sockets 1010 of the cartridge magazine 120.

Figure 11A:
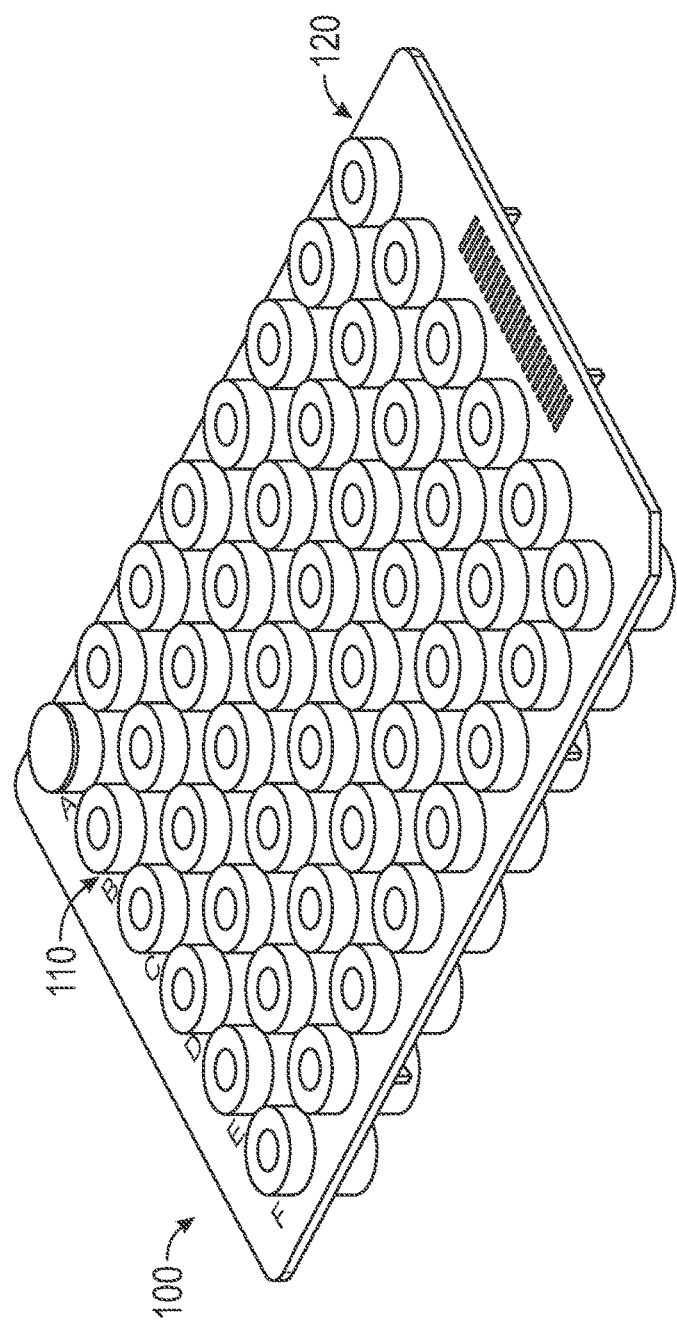
FIG. 11A is a perspective view of another example of a reagent storage assembly including a plurality of reagent cartridges.
Figure 11B:
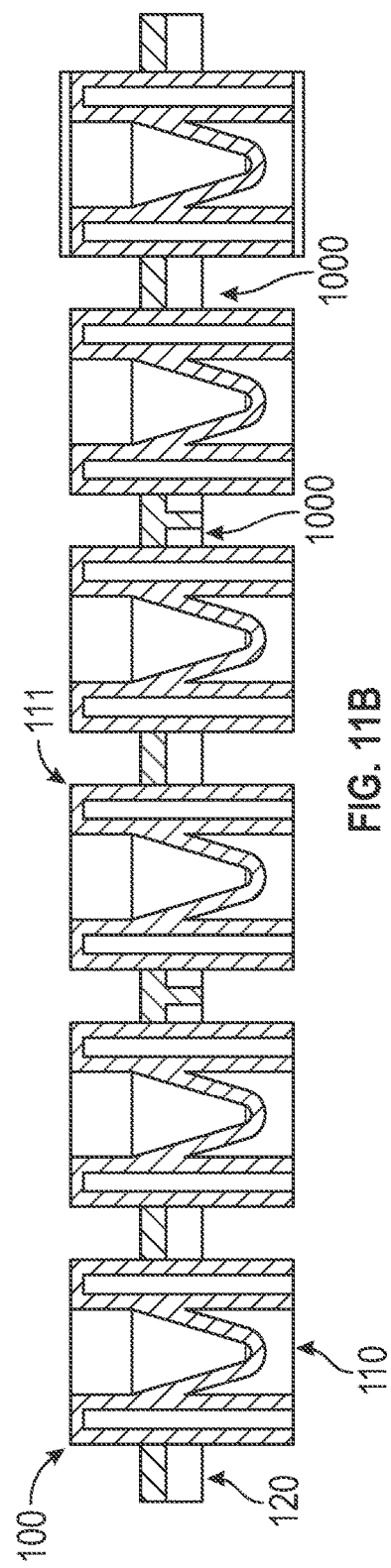
FIG. 11B is a cross sectional view of the reagent storage assembly of FIG. 11A.

FIGS. 11A and 11B are respectively a perspective view and a cross sectional view of another example of the reagent storage assembly 100 including the plurality of reagent cartridges 110. The reagent cartridges 110 are coupled with the cartridge magazine 120. In an example, the cartridges 110 are integral with the cartridge magazine 120 (e.g., the cartridges 110 and the cartridge magazine 120 are a unitary piece, or the like). In another example, the cartridges 110 are installed separately into the well sockets 1010. For example, the cartridges 110 are separable (e.g., removable, displaceable, or the like) from the cartridge magazine 120.

Figure 12A:
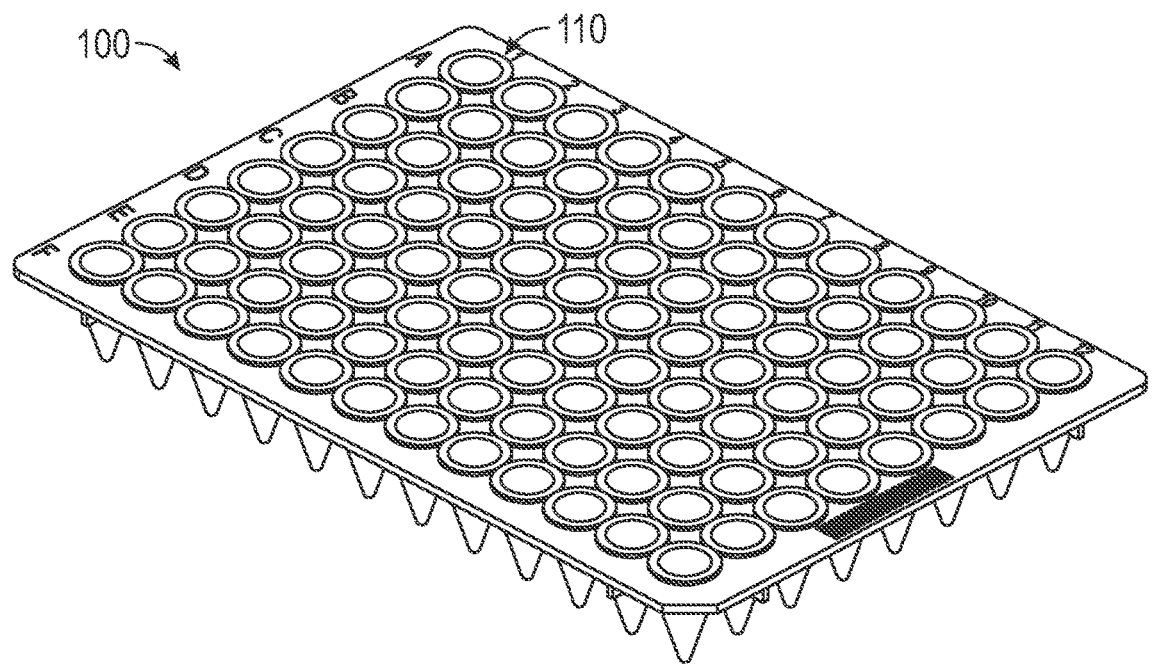
FIG. 12A is a perspective view of an additional example of a reagent storage assembly including a plurality of reagent cartridges.
Figure 12B:
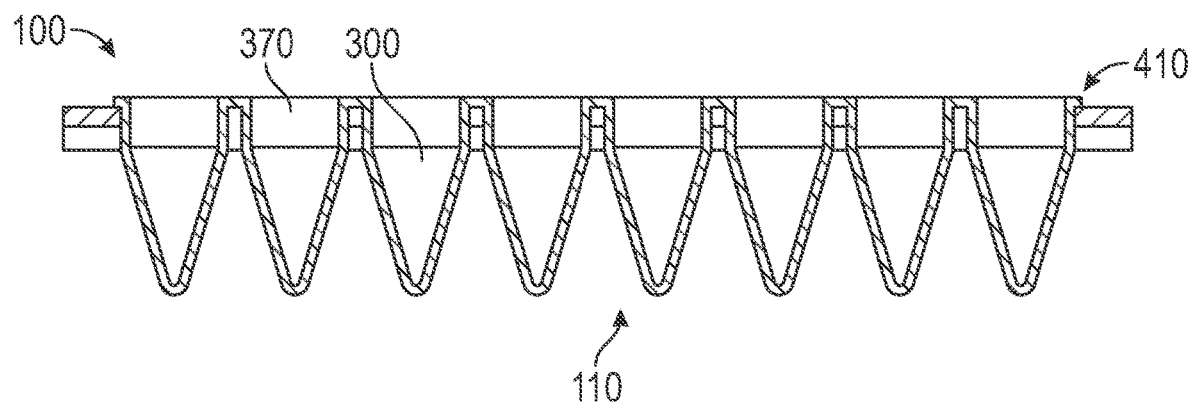
FIG. 12B is a cross sectional view of the reagent storage assembly of FIG. 12A.

FIGS. 12A and 12B are respectively a perspective view and a cross sectional view of an additional example of the reagent storage assembly 100 including the plurality of reagent cartridges 110. FIGS. 12A and 12B show the reagent cartridges 110 without the seal membrane 380 (shown in FIG. 3). The access port 370 and the reagent well 300 are visible in FIGS. 12A and 12B. The seal plate edges 410 (also shown in FIG. 4) of adjacent reagent cartridges 110 are proximate (e.g., touching, engaged, nearly touching or the like). FIGS. 10A and 10B show adjacent reagent cartridges 110 are remote (e.g., spaced, gapped, pitched, separated, or the like).

Figure 13A:
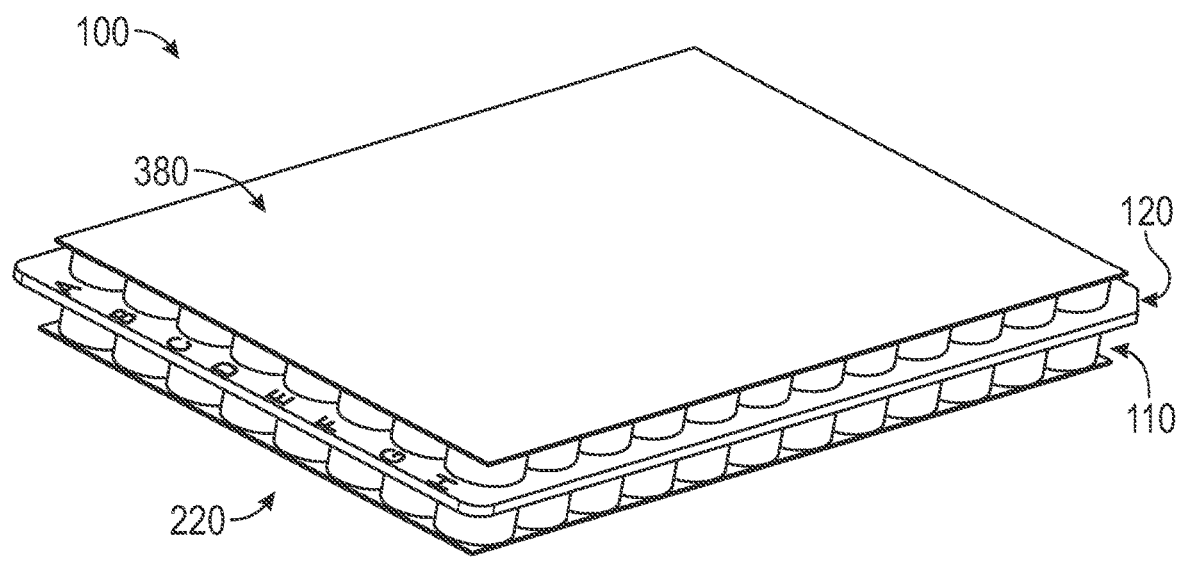
FIG. 13A is a perspective view of another example of still another reagent storage assembly including a plurality of reagent cartridges.
Figure 13B:
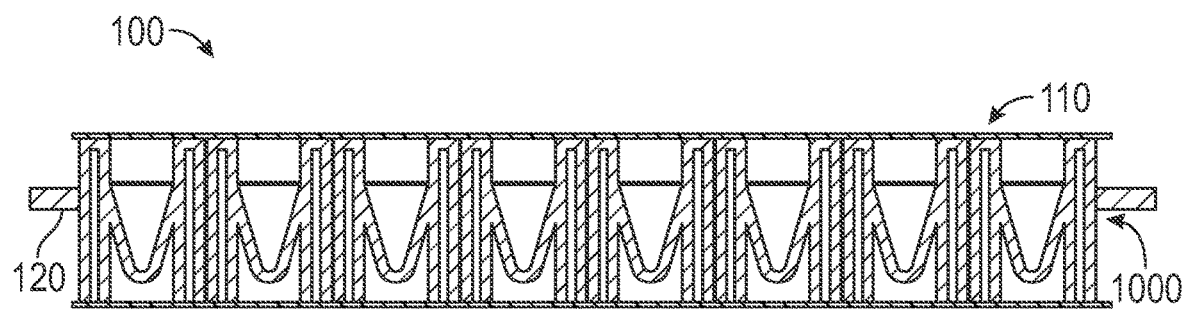
FIG. 13B is a cross sectional view of the reagent storage assembly of FIG. 13A.

FIGS. 13A and 13B are respectively a perspective view and a cross sectional view of another example of still another reagent storage assembly 100 including the plurality of reagent cartridges 110. In one example, the reagent cartridges 110 are formed integrally with the cartridge magazine 120. For instance the cartridges 110 are loaded in a specified pattern (or are the same cartridge 110) to provide an array of reagents at specified locations of the cartridge magazine 120. In another example, the reagent cartridges 110 are installed within the well sockets 140 (as shown in FIG. 1) as described herein.

As described herein, the sealing member 400 is coupled to the seal plates 400 (shown in FIG. 4) of the cartridges 110. In some examples, the sealing membrane 380 is a sheet continuously coupled along the seal plates 400 of each of the reagent cartridges 110. The isolation membrane 220 that encloses the one or more isolation cavities 340, 360 is a sheet continuously coupled along the one or more isolation walls 320, 330.

In the example shown in FIGS. 13A and 13B, the reagent cartridges 110 are clustered in tight arrays for example to enlarge the seal plates 400 (shown in FIG. 4) for affirmative coupling of the sealing membrane 380. Accordingly, one or more of the well sockets 1010 opens to adjacent well sockets 1010. As shown in FIG. 13B adjacent cartridges 110 may touch at tangent portions of the reagent cartridges 110.

Figure 14C:
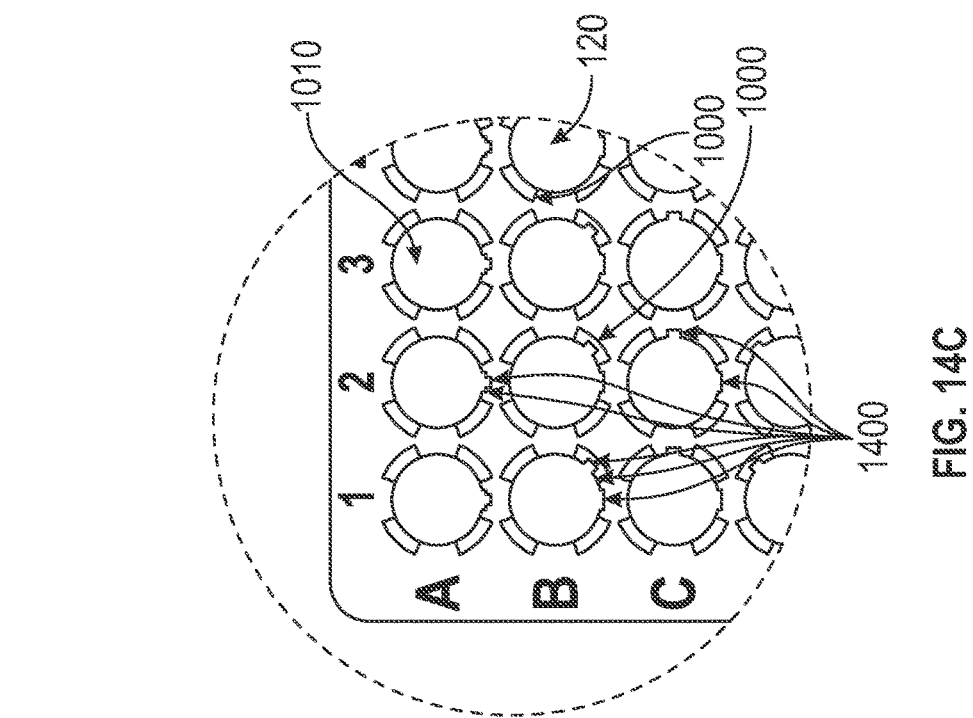
FIG. 14C is a detailed top view of a portion of the cartridge magazine of FIG. 14A showing example indexing features and indexing patterns of complementary profile seats.
Figure 14A:
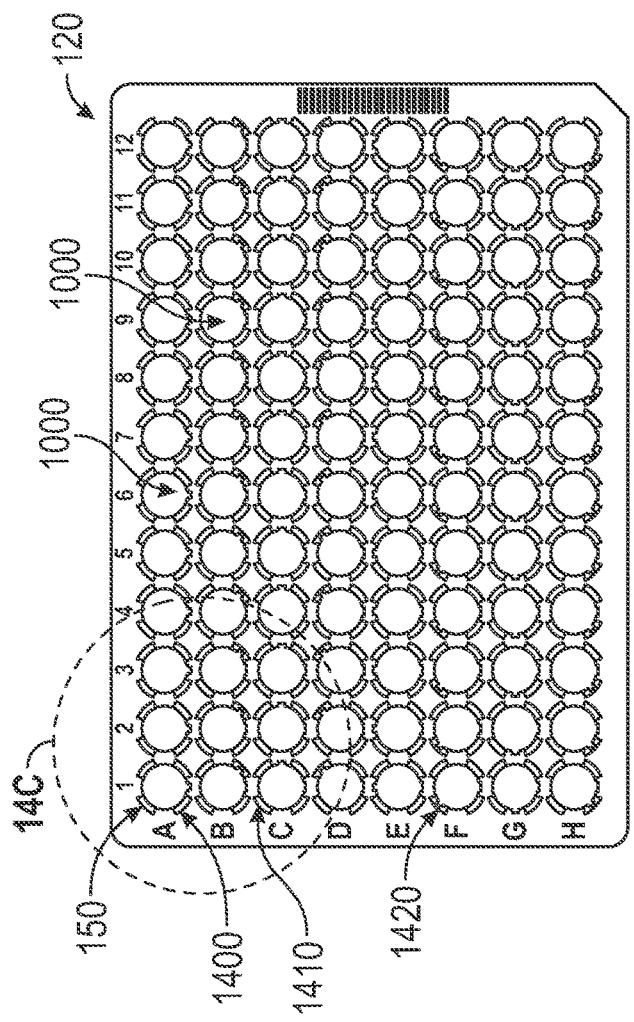
FIG. 14A is a top view of one example of a cartridge magazine including one or more complementary profile seats.
Figure 14B:
FIG. 14B is a side view of the cartridge magazine of FIG. 14A.

FIGS. 14A-14C are top views and a side view of one example of the cartridge magazine 120 including one or more complementary profile seats 1000. In this example, the magazine 120 includes the plurality of well sockets 1010 (e.g., with complementary profile seats 1000 having different profiles to ensure coupling/indexing of specified reagent cartridges 110 (shown in FIG. 1) at specified sockets 1010 seats 1000 and corresponding sockets 1010 of the cartridge magazine 120. Accordingly, the complementary profile seats 1000 have variations in their respective profiles sockets 1010 to facilitate the organized installation of cartridges having the corresponding cartridge profiles 111.

In an example, the one or more complementary profile seats 150 includes a plurality of complementary profile seats 150, for instance a first complementary profile seat 1410 and a second complementary profile seat 1420. In an example installation, the first cartridge 110A has a first cartridge profile, and the second cartridge 110B (both shown in FIG. 1) has a second cartridge profile. The first complementary profile seat 1410 is complementary to (e.g., corresponds with, matches, or the like) the first cartridge profile, and the second complementary profile seat 1420 is complementary to the second cartridge profile. Accordingly, the first reagent cartridge 110A is installed or received in the first complementary profile seat 1410, and the second reagent cartridge 110B is received or installed in the second complementary profile seat 1420. Errant installation of reagent cartridges 110 in improper zones or locations of the cartridge magazine 120 is avoided by the complementary profile seats.

In an example, the complementary profile seats 150 are unique, for instance because the complementary profile seat 1410 has a different profile from the complementary profile seat 1420. Respective cartridges having the profile matching one of the first or second seats 1410, 1420 are thereby installed in the matching seats (e.g., one of 1410 or 1420) while incompatible with the opposed seat. In another example, the complementary profile seats 150 match, for instance because the seat 1410 is the same as (or is similar to) the seat 1420. The cartridge profiles are complementary to the complementary profile seats 150. Accordingly, the cartridge profile of the first cartridge 110A optionally matches the profile of the second cartridge 110B, or the cartridge profile of the first cartridge 110A optionally does not match the profile of the second cartridge 110B.

In an example, each row of well sockets 1010 (A, B and so on) includes a complementary profile different than the complementary profile of another row of the cartridge magazine 120. Accordingly, reagent cartridges 110 having corresponding cartridge profiles are configured for coupling within the respective well sockets 1010 (in these example rows). In other examples, each of the complementary profile seats 1000 has a unique profile (e.g., indexing features, indexing pattern or the like) to facilitate coupling of a corresponding specified reagent cartridge at the well socket with the unique profile. In still other examples, zones of the cartridge magazine (e.g., sockets A5-7 to C5-7 have the same indexing features or indexing pattern to facilitate coupling of reagent cartridges 110 with a corresponding profile at that zone.

For example, the cartridge magazine optionally includes indexing features 1400. The indexing features 1400 include one or more components having different profiles (shape, size, position on the well socket 140, well seat 150, or the like) to guide installation of specified reagent cartridges 110 at specified locations of the cartridge magazine 120. For instance, the indexing features 1400 provide a keyed interface between the cartridges and the cartridge magazine 120 to facilitate installation of specified reagent cartridges to specified complementary profile seats. In another example, the indexing features 1400 are arranged in one or more indexing patterns including, but not limited to, location of features, number of features, orientation of features or the like to provide increased resolution of well sockets 1010 for a variety of corresponding reagents, reagent cartridges 110 or the like. For example, the indexing features 1400 include, but are not limited to, grooves, projections, ridges, keys, mechanical keys, bar codes, memory device, radio frequency identification device (RFID), or the like. As described in greater detail herein, the reagent cartridges 110 include complementary indexing features, patterns or the like to facilitate or preclude coupling of reagent cartridges 110 at one or more of the complementary profile seats (e.g., well sockets 1010).

In an example, the cartridge magazine 120 includes a support flange 1430. The support flange 1430 extends from the magazine body 130. The support flange 1430 elevates the magazine body 130 and accordingly minimizes contact of installed reagent cartridges 110 with a surface beneath the cartridge magazine 120 and correspondingly minimizes unseating of the cartridges 110.

FIG. 15A and a 15B are respectively a perspective view and a detailed perspective view of the cartridge magazine 120 of FIG. 14A with an example reagent cartridge 110A having a matching cartridge profile 111 to the seat 1000. As described herein, the reagent cartridges 110 include complementary indexing features, patterns or the like to facilitate or preclude coupling of reagent cartridges 110 at one or more of the complementary profile seats 1000 (e.g., well sockets 1010). The cartridge profile guides coupling of specified reagent cartridges 110 to specified (indexed) locations of the cartridge magazine 120.

The cartridge profile 111 includes one or more indexing features 1500 (e.g., ridges, grooves or the like in this example) and variations in the indexing features 1500 (shape, size, indexing pattern of features such as location, number of features, orientation or the like) ensure a specified cartridge 110A with a specified cartridge profile is installed to a complementary profile seat 1000 (e.g., surrounding the well socket 140). In some examples, cartridges 110 without the specified cartridge profile are incompatible with the complementary profile seat 1000. For instance, the complementary profile of the seat 1000 includes at least two indexing features in a dissimilar pattern to the indexing features of the reagent cartridge 110A shown in FIGS. 15A, 15B. The indexing features 1500 include, but are not limited to, grooves, projections, ridges, keys, mechanical keys, bar codes, memory device, radio frequency identification device (RFID).

In an example, the indexing features 1400, 1500 of the seats and cartridges, respectively, are arranged in one or more indexing patterns. For example, the first cartridge 110A has a first indexing pattern 1500, and the second cartridge 110B (shown in FIG. 1) has a second indexing pattern 1500'. The first indexing pattern 1500 is different than the second indexing pattern 1500', and the first indexing pattern 1500 is optionally incompatible with a seat indexing pattern 1400' that otherwise matches the second indexing patter 1500'. In some examples, the differing indexing patterns correspond to differing reagents stored within the cartridges 110.

Figure 16A:
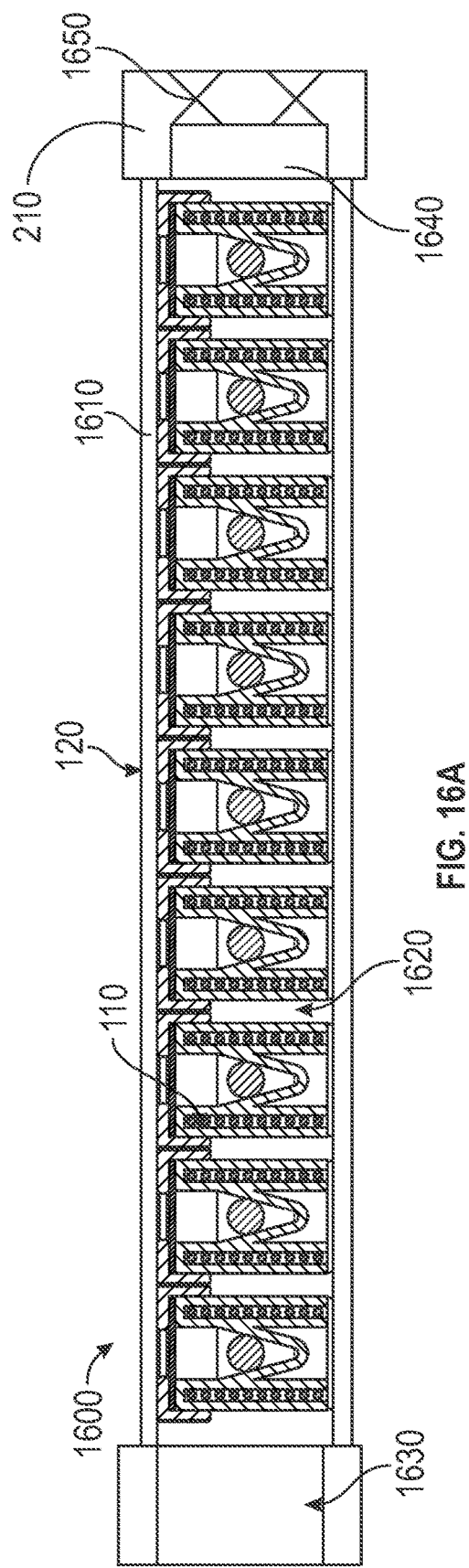
FIG. 16A is a first cross sectional view of one example of a reagent storage assembly including reagent cartridges in side-by-side configuration.
Figure 16B:
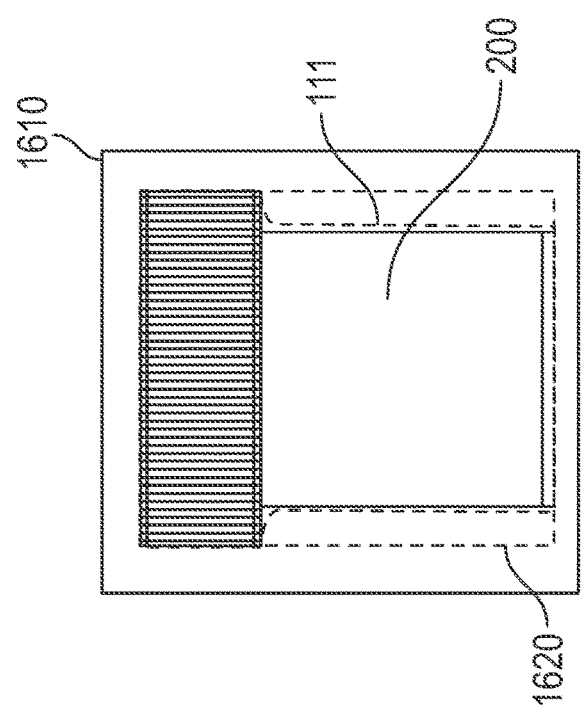
FIG. 16B is a second cross sectional view of the reagent storage assembly of FIG. 16A.

FIGS. 16A and 16B are cross sectional views of one example of a reagent storage assembly 1600 including reagent cartridges 110 in side-by-side configuration. The reagent storage assembly 1600 includes the cartridge magazine 120, and the cartridge magazine 120 optionally retains the plurality of reagent cartridges 110. In some examples, the cartridge magazine 120 includes a magazine casing 1610, and at least one complementary profile channel 1620 within the magazine casing 1610. The complementary profile channel 1620 allows for reception of the cartridges 110 within the complementary profile channel 1620. For instance, the profile of the channel 1620 is complementary to the cartridge profile 111 to slidably couple the cartridges 110 in the magazine 120 for organized retention and dispensing of the cartridges 110. Optionally, the complementary profile channel 1610 matches the cartridge profile, for instance with a profile having narrow and wider portions (like the cartridge profile shown in FIG. 14B). In an example, the cartridges 110 are stacked along the channel 610.

The cartridge profile is shown in FIG. 16B with stippled lines. The complementary profile channel 1620 is shown in FIG. 16B with dashed lines. As shown in FIG. 16B, the cartridge profile is located within the complementary profile channel 1620.

The reagent storage assembly 1600 includes a dispensing port 1630 in communication with the at least one complementary profile channel 1620. The dispensing port 1630 allows for the cartridges to be dispensed (e.g., discharged, ejected, deposited, or the like) from the reagent storage assembly 1600. In an example, a plunger 1640 is interposed between the cartridges 110 and the biasing element 1650, and the plunger 1640 biases the reagent cartridges 110 toward the dispensing port 1630 (e.g., in place of or in addition to gravity feeding). In some examples, a biasing element 1650 (e.g., compression springs, scissor linkages or the like) biases the plunger 1640 and accordingly biases the reagent cartridges 110, for instance toward the dispensing port 1630.

Figure 17A:
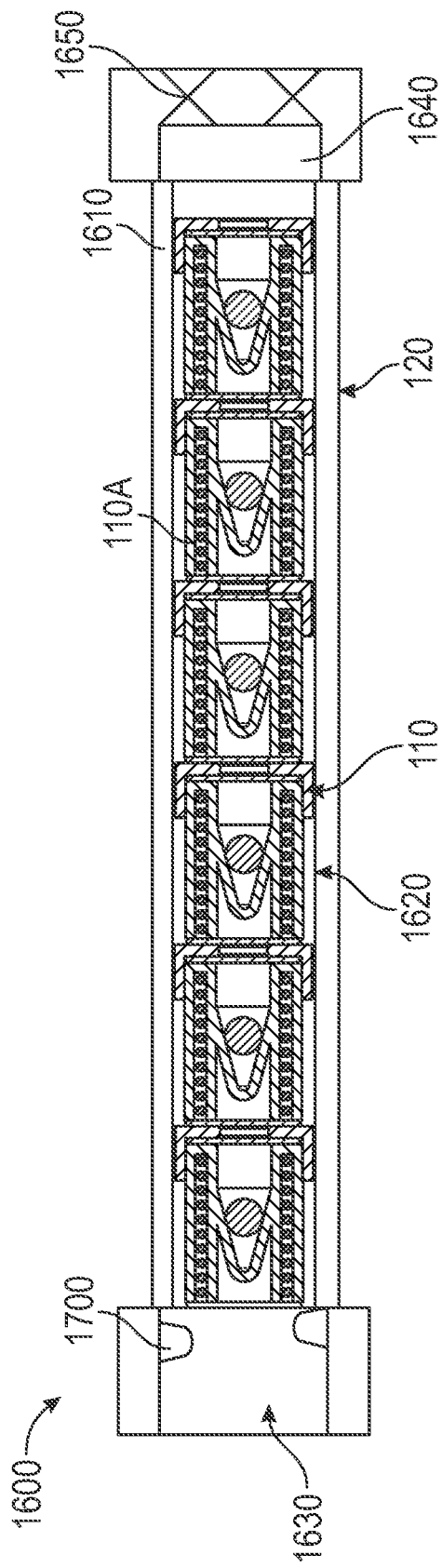
FIG. 17A is a first cross sectional view of another example of a reagent storage assembly including reagent cartridges in top-to-bottom configuration.
Figure 17B:
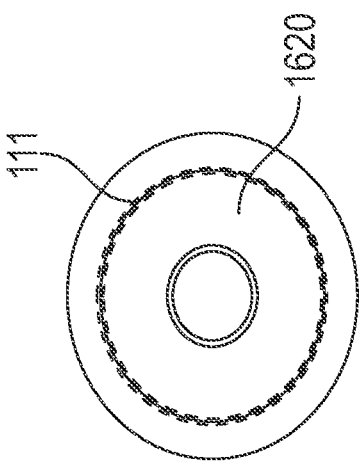
FIG. 17B is a second cross sectional view one of the reagent storage assembly of FIG. 17A.

FIGS. 17A and 17B are cross sectional views of another example of a reagent storage assembly 1600 including reagent cartridges in top-to-bottom (e.g., end-to-end) configuration. As described herein, the complementary profile channel 1620 is complementary to the cartridge profile 111 (in this example the radial perimeter of the cartridge 110A) to slidably couple the cartridges 110 in the magazine 120 for organized retention and dispensing. For example, the plunger 1640 (and the biasing element 1650) biases the reagent cartridges 110 toward the dispensing port 1630 (e.g., in place of or in addition to gravity feeding).

The reagent storage assembly 1600 optionally includes a release element 1700, and the release element 1600 selectively releases cartridges 110 from the magazine 120. For example, the release element 1700 includes a protrusion that extends into the dispensing port 1630 and inhibits the release of cartridges 110 from the magazine 120. The protrusion is moved (e.g., retracted, deflected, or the like), to facilitate dispensing of the cartridges 110 from the dispensing port 1630.

The cartridge profile 111 is shown in FIG. 17B with stippled lines. The complementary profile channel 1610 is shown in FIG. 17B with dashed lines. As shown in FIG. 17B, the cartridge profile is located within the complementary profile channel 1620.

Figure 18:
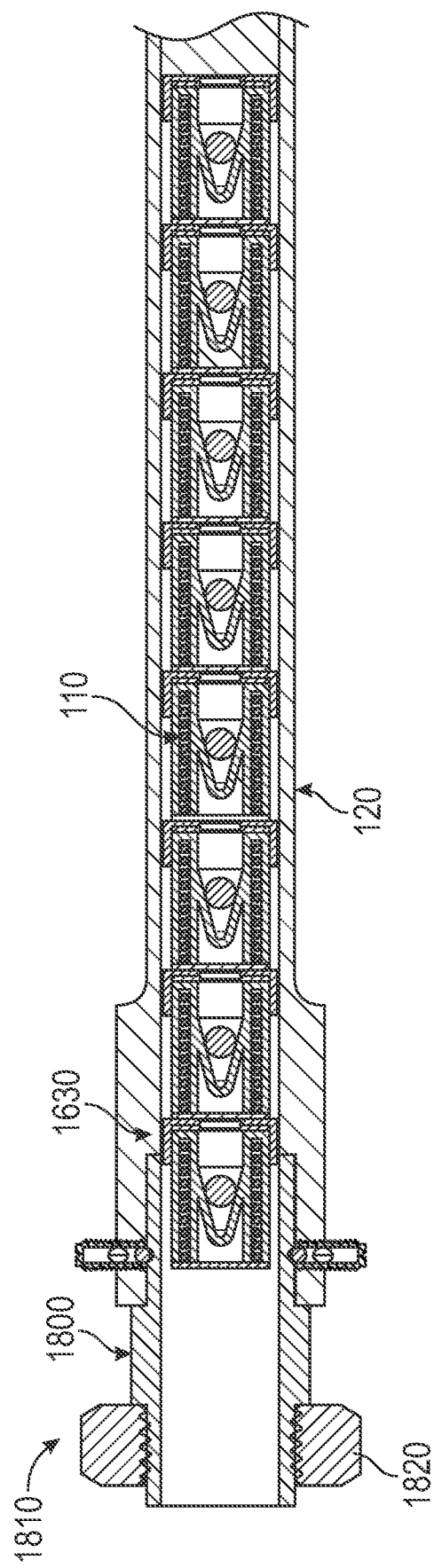
FIG. 18 is a cross sectional view showing an example cartridge magazine coupled with a magazine socket of an example magazine interface.

FIG. 18 is a cross sectional view showing an example cartridge magazine 120 coupled with a magazine socket 1800 of an example magazine interface 1810. For example, the magazine interface 1810 optionally couples with the reagent storage assembly 1600. The magazine socket 1800 includes a complementary profile 1805 to the reagent cartridges 110 for reliable coupling with the cartridge magazine 120 (e.g., the dispensing port 1630). The magazine sockets 1800 are optionally indexed by an interface housing 1820.

In one example one or more of the magazine socket 1800 or the cartridge magazine 120 includes a retaining feature 1830 configured to reliably retain the cartridge magazine 110 with the magazine interface 1810 (e.g., at a specified location on the magazine interface 1810 and ready for access/dispensing). The retaining feature 1830 includes but is not limited to, a detent and recess, interference fitting, threaded fitting, latch or the like.

The magazine interface 1810 optionally includes a plurality of magazine sockets 1800. The plurality of magazine sockets 1800 are optionally coupled with a plurality of cartridge magazines 120. Each of the magazine sockets 1800 of the is in communication with the dispensing port 1630 of an individual one of the cartridge magazines 120.

Figure 19:
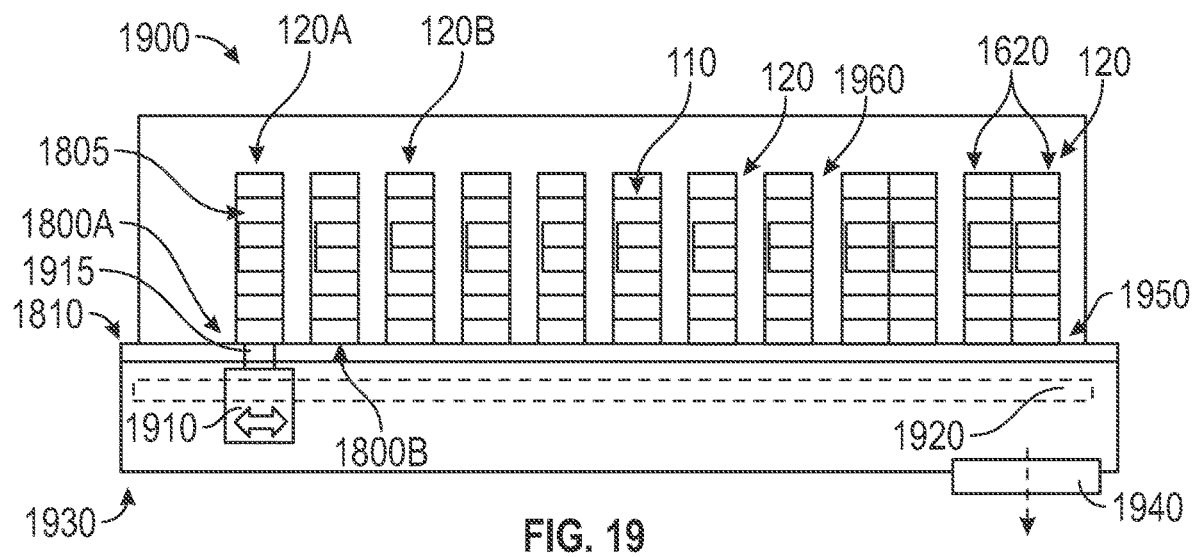
FIG. 19 is a schematic view of one example of a reagent storage and handling system.

FIG. 19 is a schematic view of one example of a reagent storage and handling system 1900. In an example, the reagent storage and handling system 1900 includes at least one cartridge magazine 120. In an example, the system 1900 includes a multi-channel cartridge magazine 120 that includes two or more channels 1620 that have a complimentary profile to the cartridge profile.

The reagent storage and handling system 1900 includes a shuttle 1910 (e.g., manipulator, or the like), and the shuttle 1910 moves between the reagent cartridges 110. In one example, the shuttle 1910 moves along a shuttle track 1920 including a rail, groove, pathway, belt or the like. The shuttle 1910 and the shuttle track 1920 are included in a manipulator housing 1930, and the shuttle 1910 retrieves one or more reagent cartridges 110 and delivers the retrieved cartridges to a diagnostic system (e.g., for conducting analyses), dispensing system (to provide a clinician with the reagent cartridge for manual testing) or the like. In an example, the shuttle 1910 includes a carriage 1915 coupled with the shuttle 1910. The carriage 1915 includes at least one cartridge fitting configured to retain at least one reagent cartridge (e.g., the cartridge 110A, shown in FIG. 1) retrieved from the plurality of reagent cartridges 110.

The system 1900 includes the magazine interface 1810. For example, the magazine interface 1810 includes an infeed fitting having magazine sockets 1800 that couple with the dispensing ports 1630 (shown in FIG. 16) of the cartridge magazines 120. The magazine sockets 1800 are optionally indexed by the interface housing 1820 (shown in FIG. 18), and accordingly the magazine interface 1810 indexes the cartridge magazines 120 for reliable interaction with the manipulator housing 1930 including a manipulator, such as a robotic manipulator, shuttle and carriage system (e.g., the shuttle 1910 and track 1920) or the like. In another example, one or more of the magazine sockets 1800, magazine interfaces 1810 and the respective magazines 120 include indexing features that provide various complementary profiles to facilitate installation of specified magazines 120 at specified magazine sockets 1800 in a similar manner to the cartridges installed to the magazines as described herein.

The system 1900 includes cartridges 110 having a variety of reagents including, but not limited to, common reagents, obscure reagents, single use reagents, multi-use reagents or the like. The system 1900 dispenses the cartridges 110 for use (e.g., by a technician performing a diagnostic test). For example, the system 1900 includes a system interface 1940 (e.g., a port, orifice, chute or the like) that provides reagent cartridges 110 retrieved by the system 1900.

As previously described herein, one or more of the magazine sockets 1800 have a specified socket profile 1950 at one or more of the indexed locations. The cartridge magazines 120 have a complementary magazine profile 1960 to the specified socket profile 1950, and the cartridge magazine are coupled at the one or more magazine sockets 1800. Accordingly, the system 1900 indexes the cartridge magazine.

In some examples, the cartridge magazines 120 correspond to specific reagents. For example, a first cartridge magazine 120A includes cartridges 110 having a first cartridge profile and storing a first specified reagent. The magazine 120A is complementary to a magazine socket 1800A. A second cartridge magazine 120B includes cartridges 110 having a second cartridge profile and storing a second specified reagent. The magazine 120B is complementary to a magazine socket 1800B. The first specified reagent is optionally different than the second specified reagent, and accordingly the system 1900 is configured to dispense a plurality of reagents from the magazines 120A, B at the corresponding magazine sockets 1800A, B, respectively. In some examples, each of the complementary socket profiles and/or each of the complementary magazine profiles correspond to a specified reagent (e.g., the first specified reagent or the second specified reagent).

Figure 20:
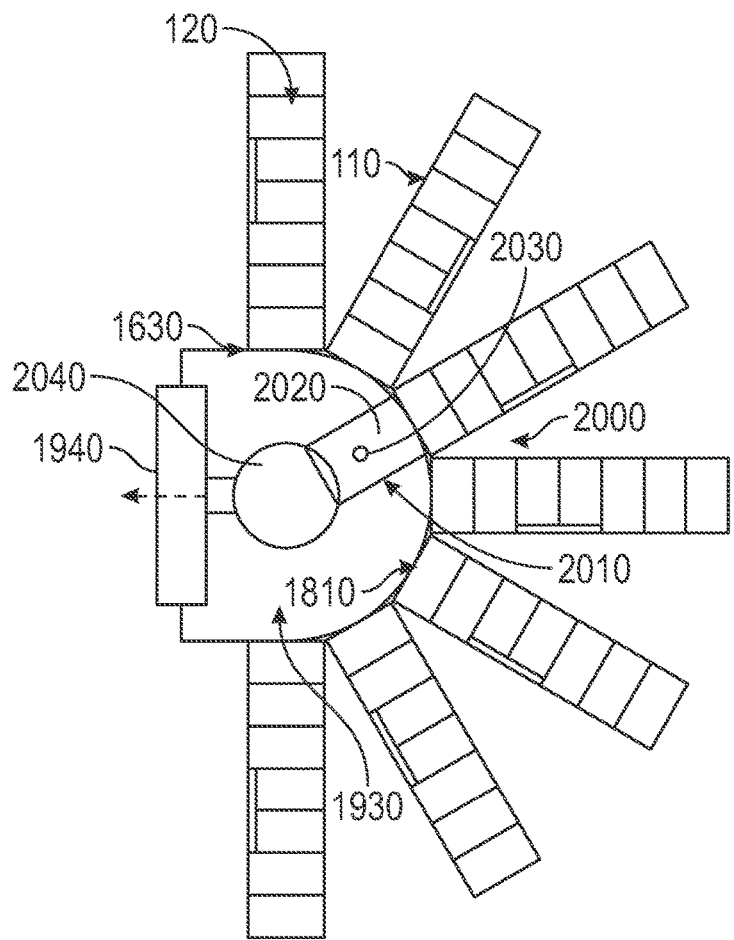
FIG. 20 is a schematic view of another example of a reagent storage and handling system.

FIG. 20 is a schematic view of another example of a reagent storage and handling system 2000. The system 1900 includes the magazine interface 1810. For instance, the magazine interface 1810 includes a plate, shell, housing or the like having a plurality of magazine sockets 1800 (shown in FIG. 18) for coupling with reagent cartridges 110 and reliably indexing the cartridge magazines 110 on the interface 1810.

The system 2000 includes the manipulator housing 1930 and a manipulator 2010 (e.g., the shuttle 1910, robot arm, elevator or the like) that aligns with specified reagent cartridge dispensing ports 1630. The manipulator 2010 receives one or more dispensed reagent cartridges 110. For example, the manipulator 2010 includes a manipulator arm 2020 traversable to one or more of the dispensing ports 1630 to retrieve reagent cartridges 110 (e.g., through grasping, alignment of a reception port on the arm 2020 with the dispensing port 1630 or the like). In an example, a manipulator actuator 2040 traverses the manipulator arm 2020 to the dispensing ports 1630 of two or more of the cartridge magazines 120. The manipulator arm 2020 delivers the retrieved reagent cartridges 110 to the system interface 1940 (e.g., with belts, additional manipulation and positioning, tracks or raceways or the like). Optionally, the housing 1930 is a hopper that stores dispensed reagent cartridges 110 prior to delivery to a system, such as diagnostic or dispensing systems. In some examples, the manipulator 2010 includes a cartridge fitting 2030 that retains at least one reagent cartridge (e.g., the cartridge 110A, shown in FIG. 1) retrieved from the plurality of reagent cartridges 110.

Figure 21:
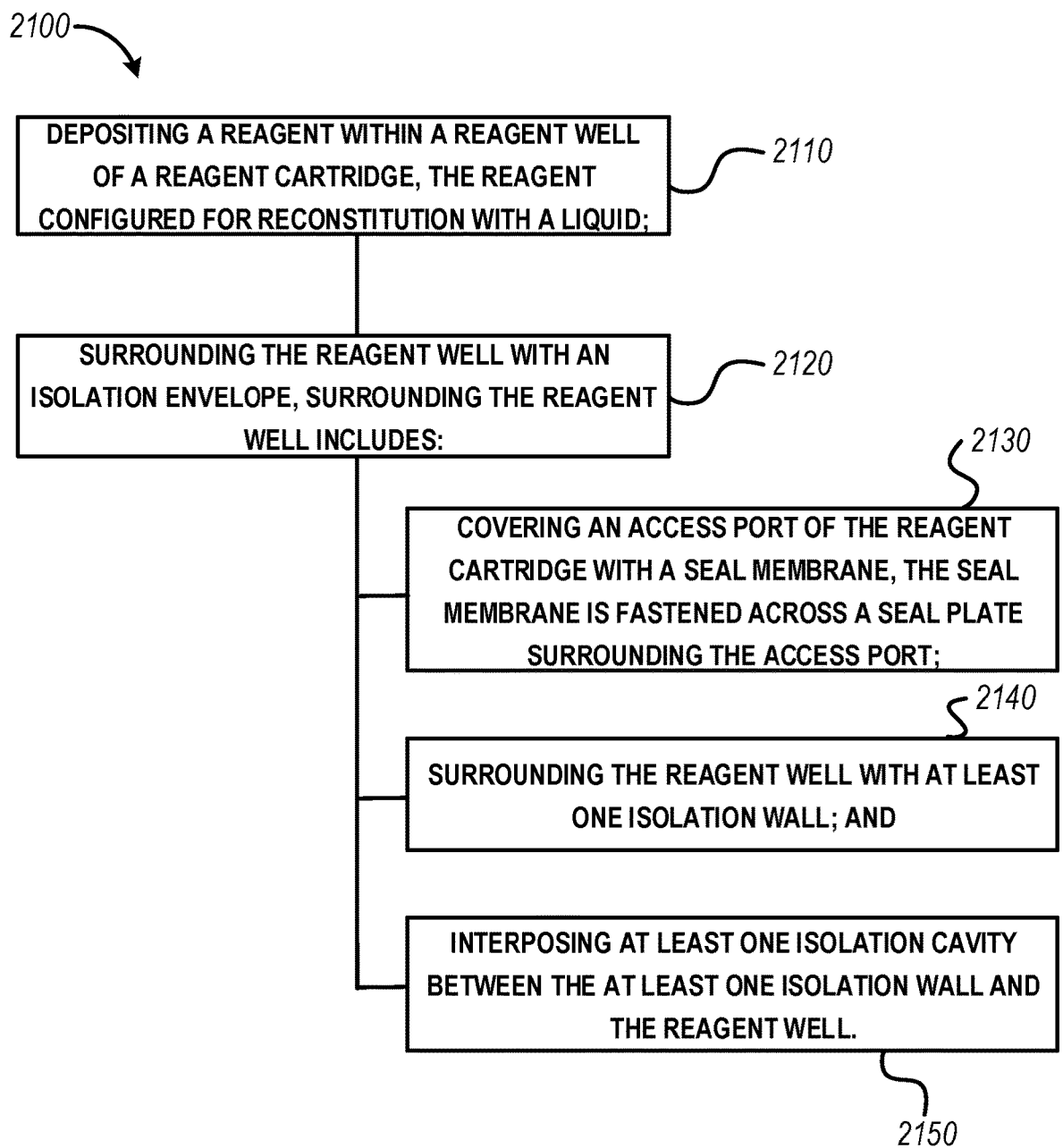
FIG. 21 shows one example of a method for storing a reagent.

FIG. 21 shows one example of a method 2100 for storing a reagent, including one or more of the reagent storage assembly 100, the reagent storage assembly 1600, or the reagent storage and handling system 1900 described herein.

In describing the method 2100, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 2100 include, but are not limited to, the corresponding numbered elements provided herein and other corresponding elements described herein (both numbered and unnumbered) as well as their equivalents.

At 2110, a reagent 310 is deposited within a reagent well 300 of a reagent cartridge 110. In some examples, the reagent is configured for reconstitution with a liquid (e.g., distilled water, or the like).

At 2120, the reagent well 300 is surrounded with an isolation envelope 115. In an example, the isolation envelope 115 partially surrounds the reagent well 300. In another example, the isolation envelope 115 entirely surrounds the reagent well 300. The reagent well is optionally nested within each of the at least one isolation wall 320, 330 and the at least one isolation cavity 340, 360. The at least one isolation cavity 340, 360 is optionally filled with a desiccant 350. Accordingly, the various membranes, walls, cavities, desiccants or the like described herein provide a tiered or nested series of barriers or obstacles to minimize (e.g., slow, prevent, minimize) the ingress of moisture or vapor to the reagent 310.

At 2130, surrounding the reagent well 300 includes covering an access port 370 of the reagent cartridge 110 with a seal membrane 380. The seal membrane 380 is optionally fastened across a seal plate 400 surrounding the access port 370. For instance, the seal membrane 280 is fastened to the seal plate 400. In some examples, the seal plate 400 extends from the access port 370 to a seal plate edge 410 remote from the access port 370.

At 2140, surrounding the reagent well 300 includes surrounding the reagent well 300 with at least one isolation wall, for instance a first isolation wall 320 or a second isolation wall 330. For example, surrounding the reagent well 300 is optionally surrounded with at least the first and second isolation walls 320, 330. In an example, the second isolation wall 330 is nested within the first isolation wall 320. Additionally, the reagent well 300 is optionally nested within the second isolation wall 330 and the first isolation wall 320.

At 2150, surrounding the reagent well 300 includes interposing at least one isolation cavity (e.g., the isolation cavity 340 or the isolation cavity 360, shown in FIG. 3) between the at least one isolation wall and the reagent well 300. For example, a first isolation cavity 340 is optionally interposed between the first isolation wall 320 and the second isolation wall 330 and the reagent well 300. A second isolation cavity 360 is optionally interposed between the second isolation wall 330 and the reagent well 300. In some examples, the reagent well 300 is nested within the first and second isolation walls 320, 330 and the first and second isolation cavities 340, 360.

Several options for the method 2100 follow. For example, a cartridge cap 210 is optionally coupled with the reagent cartridge 110, and the cartridge cap 210 clamps the seal membrane 280 to the reagent cartridge 110. The plurality of reagent cartridges 110 are optionally biased toward a dispensing port 1630, for instance with at least one biasing element 1650.

A plurality of the reagent cartridges 110 are optionally installed within a cartridge magazine 120. For example, each of the reagent cartridges 110 of the plurality of reagent cartridges 110 are positioned in a respective well socket 140 of a magazine body 130. A cartridge profile 111 of each reagent cartridge is optionally engaged with a complementary profile well seat 1000 extending around each well socket 140.

In an example, the plurality of reagent cartridges 110 include at least first and second reagent cartridges 110 having respective first and second cartridge profiles. The complementary profile well seats 150 include first and second complementary profile well seats 150. The plurality of reagent cartridges 110 are optionally installed within the magazine 120. For example, the first reagent cartridge profile is engaged with the first complementary profile well seat. The second reagent cartridge profile is engaged with the second complementary profile well seat. The first reagent cartridge profile is optionally incompatible with the second complementary profile well seat. The second reagent cartridge profile is optionally incompatible with the first complementary profile well seat.

In some examples, the first reagent cartridge profile is engaged with the first complementary profile well seat. The second reagent cartridge profile is engaged with the second complementary profile well seat. The first reagent cartridge profile is optionally incompatible with the second complementary profile well seat. The second reagent cartridge profile is optionally incompatible with the first complementary profile well seat.

Various Notes & Aspects

Aspect 1 can include or use subject matter (such as an apparatus, a system, a device, a method, a means for performing acts, or a device readable medium including instructions that, when performed by the device, can cause the device to perform acts, or an article of manufacture), such as can include or use A reagent cartridge comprising: a cartridge body configured to store a solid reagent, the cartridge body includes: a reagent well accessible through an access port, the reagent well includes a well sidewall and is configured to store the solid reagent, and a seal plate proximate the access port, the seal plate extends away from the access port to a seal plate edge remote from the access port; and an isolation envelope surrounding the reagent well, the isolation envelope includes: a seal membrane covering the access port, the seal membrane is fastened across the seal plate between the seal plate edge and the access port, at least one isolation wall, and at least one isolation cavity interposed between the isolation wall and the well sidewall.

Aspect 2 can include or use, or can optionally be combined with the subject matter of Aspect 1, to optionally include or use wherein the isolation envelope includes a desiccant in the at least one isolation cavity.

Aspect 3 can include or use, or can optionally be combined with the subject matter of one or any combination of Aspects 1 or 2 to optionally include or use wherein the reagent well is nested within the at least one isolation wall and the at least one isolation cavity.

Aspect 4 can include or use, or can optionally be combined with the subject matter of one or any combination of Aspects 1 through 3 to optionally include or use wherein the isolation envelope includes an isolation membrane coupled with the isolation wall and enclosing the at least one isolation cavity.

Aspect 5 can include or use, or can optionally be combined with the subject matter of one or any combination of Aspects 1 through 4 to optionally include or use wherein the at least one isolation wall includes first and second isolation walls, the at least one isolation cavity includes first and second isolation cavities, and the first and second isolation cavities and the reagent well are separated.

Aspect 6 can include or use, or can optionally be combined with the subject matter of Aspect 5 to optionally include or use wherein the second isolation cavity is nested between the reagent well and the first isolation cavity.

Aspect 7 can include or use, or can optionally be combined with the subject matter of one or any combination of Aspects 5 or 6 to optionally include or use wherein the first isolation cavity is between the first isolation wall and the second isolation wall, the second isolation cavity is between the second isolation wall and the reagent sidewall, and each of the first and second isolation walls and the first and second isolation cavities surrounds the reagent well.

Aspect 8 can include or use, or can optionally be combined with the subject matter of one or any combination of Aspects 5 through 7 to optionally include or use wherein the reagent well is nested within each of the first and second isolation walls and the first and second isolation cavities.

Aspect 9 can include or use, or can optionally be combined with the subject matter of one or any combination of Aspects 5 through 8 to optionally include or use wherein the isolation envelope includes an isolation membrane coupled with the first and second isolation walls and enclosing each of the first and second isolation cavities.

Aspect 10 can include or use, or can optionally be combined with the subject matter of one or any combination of Aspects 1 through 9 to optionally include or use wherein the isolation envelope surrounding the reagent well includes the isolation envelope fully surrounding or partially surrounding the reagent well.

Aspect 11 can include or use, or can optionally be combined with the subject matter of one or any combination of Aspects 1 through 10 to optionally include or use wherein a seal plate area of the seal plate is larger than an access port area of the access port.

Aspect 12 can include or use, or can optionally be combined with the subject matter of one or any combination of Aspects 1 through 11 to optionally include or use wherein the cartridge body includes a cartridge profile configured for reception within a cartridge magazine.

Aspect 13 can include or use, or can optionally be combined with the subject matter of Aspect 12 to optionally include or use a cartridge magazine having a complementary profile to the cartridge profile, the cartridge profile is coupled with the complementary profile.

Aspect 14 can include or use, or can optionally be combined with the subject matter of one or any combination of Aspects 12 or 13 to optionally include or use wherein the cartridge magazine includes a magazine tray, and the complementary profile includes a plurality of complementary profile seats configured for seating the cartridge profile.

Aspect 15 can include or use, or can optionally be combined with the subject matter of one or any combination of Aspects 12 through 14 to optionally include or use wherein the cartridge magazine includes a magazine casing, and the complementary profile includes at least one complementary profile channel configured for slidable coupling with the cartridge profile.

Aspect 16 can include or use subject matter (such as an apparatus, a system, a device, a method, a means for performing acts, or a device readable medium including instructions that, when performed by the device, can cause the device to perform acts, or an article of manufacture), such as can include or use a reagent cartridge comprising: a cartridge body configured to store a solid reagent, the cartridge body includes: a reagent well accessible through an access port, the reagent well includes a well sidewall and is configured to store the solid reagent, and a seal plate proximate the access port, the seal plate extends away from the access port to a seal plate edge remote from the access port; a seal membrane covering the access port, the seal membrane is fastened with the seal plate between the seal plate edge and the access port; and wherein the cartridge body includes a cartridge profile configured for complementary seating within a cartridge magazine.

Aspect 17 can include or use, or can optionally be combined with the subject matter of Aspect 16, to optionally include or use wherein the cartridge profile includes one or more indexing features configured for coupling with a complementary profile of the cartridge magazine.

Aspect 18 can include or use, or can optionally be combined with the subject matter of Aspect 17 to optionally include or use the cartridge magazine and a plurality of reagent cartridges, wherein each of the reagent cartridges of the plurality of reagent cartridges includes the cartridge profile having the one or more indexing features in at least one indexing pattern, and wherein the complementary profile of the cartridge magazine includes a plurality of complementary profile seats, and one or more of the complementary profile seats is configured to seat at least one of the reagent cartridges having the one or more indexing features in the at least one indexing pattern.

Aspect 19 can include or use, or can optionally be combined with the subject matter of Aspect 18 to optionally include or use wherein the at least one indexing pattern includes a plurality of indexing patterns, each of the reagent cartridges includes the cartridge profile having the one or more indexing features in an indexing pattern of the plurality of indexing patterns, each of the indexing patterns are different for each reagent cartridge, and each of the complementary profile seats are configured to seat reagent cartridges having one of the indexing patterns of the plurality of indexing patterns.

Aspect 20 can include or use, or can optionally be combined with the subject matter of one or any combination of Aspects 18 or 19 to optionally include or use wherein the cartridge magazine includes a well plate frame.

Aspect 21 can include or use, or can optionally be combined with the subject matter of one or any combination of Aspects 17 through 20 to optionally include or use the cartridge magazine and a plurality of reagent cartridges having the cartridge profile, wherein the cartridge magazine includes a magazine casing having at least one complementary profile channel as the complementary profile, and the cartridge profiles of the plurality of reagent cartridges are seated and slidably coupled with the complementary profile channel.

Aspect 22 can include or use, or can optionally be combined with the subject matter of one or any combination of Aspects 16 through 21 to optionally include or use wherein the cartridge body includes an anchor fitting configured to secure the cartridge body to the cartridge magazine.

Aspect 23 can include or use, or can optionally be combined with the subject matter of one or any combination of Aspects 16 through 22 to optionally include or use an isolation envelope surrounding the reagent well, the isolation envelope includes: at least one isolation wall, and at least one isolation cavity interposed between the isolation wall and the well sidewall.

Aspect 24 can include or use, or can optionally be combined with the subject matter of Aspect 23 to optionally include or use wherein the isolation envelope includes the seal membrane.

Aspect 25 can include or use, or can optionally be combined with the subject matter of one or any combination of Aspects 23 or 24 to optionally include or use wherein the reagent well is nested within the at least one isolation wall and the at least one isolation cavity.

Aspect 26 can include or use, or can optionally be combined with the subject matter of one or any combination of Aspects 23 through 25 to optionally include or use wherein the isolation envelope includes an isolation membrane coupled with the isolation wall and enclosing the at least one isolation cavity.

Aspect 27 can include or use subject matter (such as an apparatus, a system, a device, a method, a means for performing acts, or a device readable medium including instructions that, when performed by the device, can cause the device to perform acts, or an article of manufacture), such as can include or use a reagent storage assembly comprising: a cartridge magazine configured for reception of a plurality of reagent cartridges, the cartridge magazine includes: a magazine body, a plurality of complementary profile seats including at least first and second complementary profile seats; the plurality of reagent cartridges, each of the reagent cartridges of the plurality of reagent cartridges includes: a cartridge body having a cartridge profile, a reagent well configured to store a solid reagent, and a sealed access port proximate the reagent well; and wherein the plurality of reagent cartridges includes at least first and second reagent cartridges, and the cartridge profile includes at least first and second cartridge profiles: at least the first reagent cartridge includes the first cartridge profile, and the first reagent cartridge is received in one or more first complementary profile seats that are complementary to the first cartridge profile, and at least the second reagent cartridge includes the second cartridge profile, and the second reagent cartridge is received in one or more of the second complementary profile seats that are complementary to the second cartridge profile.

Aspect 28 can include or use, or can optionally be combined with the subject matter of Aspect 27, to optionally include or use wherein the first and second complementary profile seats have matching seat profiles, and the first and second cartridge profiles are matching cartridge profiles.

Aspect 29 can include or use, or can optionally be combined with the subject matter of one or any combination of Aspects 27 or 28 to optionally include or use wherein the first and second complementary profile seats have different seat profiles and the first and second cartridge profiles are different cartridge profiles, and the first reagent cartridge is incompatible with the second complementary profile seat and the second reagent cartridge is incompatible with the first complementary profile seat.

Aspect 30 can include or use, or can optionally be combined with the subject matter of one or any combination of Aspects 27 through 29 to optionally include or use wherein the cartridge profile includes one or more indexing features in one or more indexing patterns, and the complementary profile seats include corresponding indexing features in one or more corresponding indexing patterns.

Aspect 31 can include or use, or can optionally be combined with the subject matter of Aspect 30 to optionally include or use wherein the one or more indexing patterns include a plurality of different indexing patterns, and each of the different indexing patterns corresponds to a different solid reagent.

Aspect 32 can include or use, or can optionally be combined with the subject matter of one or any combination of Aspects 27 through 31 to optionally include or use wherein one or more of the magazine body or the cartridge body includes an anchor fitting configure to secure the cartridge body to the cartridge magazine.

Aspect 33 can include or use, or can optionally be combined with the subject matter of Aspect 32 to optionally include or use wherein the anchor fitting includes one or more of an interference fitting, a detent and recess fitting, or a threaded fitting.

Aspect 34 can include or use, or can optionally be combined with the subject matter of one or any combination of Aspects 27 through 33 to optionally include or use wherein the cartridge magazine includes a well plate, and the plurality of complementary profile seats includes well seats extending around a plurality of well sockets.

Aspect 35 can include or use, or can optionally be combined with the subject matter of one or any combination of Aspects 27 through 34 to optionally include or use wherein the sealed access ports of the plurality of reagent cartridges are sealed with one or more seal membranes.

Aspect 36 can include or use, or can optionally be combined with the subject matter of Aspect 35 to optionally include or use wherein the one or more seal membranes include a continuous seal sheet covering each of the access ports of the plurality of reagent cartridges.

Aspect 37 can include or use, or can optionally be combined with the subject matter of one or any combination of Aspects 27 through 36 to optionally include or use wherein the cartridge bodies of the plurality of reagent cartridges and the magazine body of the cartridge magazine are integral.

Aspect 38 can include or use, or can optionally be combined with the subject matter of one or any combination of Aspects 27 through 37 to optionally include or use wherein the plurality of reagent cartridges are separable from the cartridge magazine, and the reagent cartridges of the plurality of reagent cartridges are configured for installation at respective complementary profile seats of the of the plurality of complementary profile seats.

Aspect 39 can include or use subject matter (such as an apparatus, a system, a device, a method, a means for performing acts, or a device readable medium including instructions that, when performed by the device, can cause the device to perform acts, or an article of manufacture), such as can include or use a reagent storage assembly comprising: a cartridge magazine configured to retain a plurality of reagent cartridges, the cartridge magazine includes: a magazine casing, at least one complementary profile channel within the magazine casing, and a dispensing port in communication with the at least one complementary profile channel; the plurality of reagent cartridges, each of the reagent cartridges of the plurality of reagent cartridges includes: a cartridge body having a cartridge profile, a reagent well configured to store a solid reagent; and wherein the plurality of reagent cartridges are slidably coupled along the at least one complementary profile channel, and the cartridge profiles of the plurality of reagent cartridges are complementary to the at least one complementary profile channel.

Aspect 40 can include or use, or can optionally be combined with the subject matter of Aspect 39, to optionally include or use wherein the reagent cartridges are stacked along the at least one complementary profile channel.

Aspect 41 can include or use, or can optionally be combined with the subject matter of Aspect 40 to optionally include or use wherein the reagent cartridges are slidable coupled along the at least one complementary profile channel in a side by side configuration.

Aspect 42 can include or use, or can optionally be combined with the subject matter of one or any combination of Aspects 40 or 41 to optionally include or use wherein the reagent cartridges are slidable coupled along the at least one complementary profile channel in a top to bottom configuration.

Aspect 43 can include or use, or can optionally be combined with the subject matter of one or any combination of Aspects 39 through 42 to optionally include or use wherein the dispensing port is configured for coupling with one or more of a hopper, cartridge interface or manipulator housing.

Aspect 44 can include or use, or can optionally be combined with the subject matter of one or any combination of Aspects 39 through 43 to optionally include or use wherein the cartridge magazine includes at least one biasing element configured to bias the plurality of reagent cartridges toward the dispensing port.

Aspect 45 can include or use, or can optionally be combined with the subject matter of Aspect 44 to optionally include or use a plunger coupled with the at least one basing element and interposed between a reagent cartridge of the plurality of reagent cartridges and the at least one biasing element.

Aspect 46 can include or use subject matter (such as an apparatus, a system, a device, a method, a means for performing acts, or a device readable medium including instructions that, when performed by the device, can cause the device to perform acts, or an article of manufacture), such as can include or use a reagent storage and handling system comprising: a plurality of cartridge magazines, each cartridge magazine configured to retain two or more reagent cartridges, each of the cartridge magazines includes: a magazine body, at least one complementary profile channel within the magazine casing, a dispensing port in communication with the at least one complementary profile channel, and the two or more reagent cartridges received in the at least one complementary profile channel, each of the reagent cartridges includes a reagent configured for reconstitution; and a magazine interface including a plurality of magazine sockets coupled with the plurality of cartridge magazines, each of the magazine sockets of the plurality of magazine sockets is in communication with the dispensing port of a cartridge magazine of the plurality of cartridge magazines.

Aspect 47 can include or use, or can optionally be combined with the subject matter of Aspect 46, to optionally include or use wherein the magazine interface includes an interface housing with the plurality of magazine sockets in indexed locations.

Aspect 48 can include or use, or can optionally be combined with the subject matter of Aspect 47 to optionally include or use wherein one or more of the magazine sockets have a specified socket profile at one or more of the indexed locations, and cartridge magazines of the plurality of cartridge magazines coupled at the one or more magazine sockets have a complementary magazine profile to the specified socket profile.

Aspect 49 can include or use, or can optionally be combined with the subject matter of Aspect 48 to optionally include or use wherein the reagent includes a specified reagent, and wherein the cartridge magazines having the complementary magazine profile include the specified reagent, and the reagent cartridges at the one or more indexed locations include the specified reagent.

Aspect 50 can include or use, or can optionally be combined with the subject matter of one or any combination of Aspects 47 through 49 to optionally include or use wherein the reagent includes a specified reagent, and each of the magazine sockets of the plurality of magazine sockets have specified socket profiles at the indexed locations, respectively, each of the cartridge magazines of the plurality of cartridge magazines coupled at the magazine sockets have complementary magazine profiles to the specified socket profiles, and wherein each specified socket profile and each complementary magazine profile corresponds to a specified reagent.

Aspect 51 can include or use, or can optionally be combined with the subject matter of one or any combination of Aspects 46 through 50 to optionally include or use wherein each of the cartridge magazines of the plurality of cartridge magazines includes one or more indexing features configured for indexing with a respective magazine socket of the plurality of the magazine sockets.

Aspect 52 can include or use, or can optionally be combined with the subject matter of Aspect 51 to optionally include or use wherein the indexing features include one or more of a mechanical key, a bar code, a memory device or a radio frequency identification device.

Aspect 53 can include or use, or can optionally be combined with the subject matter of one or any combination of Aspects 46 through 52 to optionally include or use a manipulator assembly coupled with the magazine interface.

Aspect 54 can include or use, or can optionally be combined with the subject matter of Aspect 53 to optionally include or use wherein the manipulator includes: a manipulator housing, and a manipulator coupled with the manipulator housing, the manipulator configured to retrieve one or more reagent cartridges from the plurality of reagent cartridge magazines coupled with the corresponding plurality of magazine sockets.

Aspect 55 can include or use, or can optionally be combined with the subject matter of one or any combination of Aspects 53 or 54 to optionally include or use wherein the manipulator includes: a shuttle coupled along a shuttle track, and a carriage coupled with the shuttle, the carriage includes at least one cartridge fitting configured to retain at least one reagent cartridge retrieved from the plurality of reagent cartridges.

Aspect 56 can include or use, or can optionally be combined with the subject matter of one or any combination of Aspects 53 through 55 to optionally include or use wherein the manipulator includes: a manipulator arm configured to retrieve the one or more reagent cartridges from the plurality of reagent cartridge magazines, and a manipulator actuator configured to traverse the manipulator arm to the dispensing ports of two or more of the cartridge magazines of the plurality of cartridge magazines.

Aspect 57 can include or use, or can optionally be combined with the subject matter of one or any combination of Aspects 53 through 56 to optionally include or use wherein the manipulator assembly includes a system interface configured to convey reagent cartridges from one or more of the cartridge magazines of the plurality of cartridge magazines to a dispensing system or a diagnostic system.

Aspect 58 can include or use subject matter (such as an apparatus, a system, a device, a method, a means for performing acts, or a device readable medium including instructions that, when performed by the device, can cause the device to perform acts, or an article of manufacture), such as can include or use a method of storing a reagent comprising: depositing a reagent within a reagent well of a reagent cartridge, the reagent configured for reconstitution with a liquid; surrounding the reagent well with an isolation envelope, enclosing the reagent well includes: covering an access port of the reagent cartridge with a seal membrane, the seal membrane is fastened across a seal plate surrounding the access port, surrounding the reagent well with at least one isolation wall, and interposing at least one isolation cavity between the at least one isolation wall and the reagent well.

Aspect 59 can include or use, or can optionally be combined with the subject matter of Aspect 58, to optionally include or use wherein covering the access port with the seal membrane includes fastening the seal membrane to the seal plate, and the seal plate extends from the access port to a seal plate edge remote from the access port.

Aspect 60 can include or use, or can optionally be combined with the subject matter of one or any combination of Aspects 58 or 59 to optionally include or use wherein coupling a cartridge cap with the reagent cartridge, and the cartridge cap clamps the seal membrane to the reagent cartridge.

Aspect 61 can include or use, or can optionally be combined with the subject matter of one or any combination of Aspects 58 through 60 to optionally include or use wherein surrounding the reagent well with the isolation envelope includes at least partially surrounding the reagent well.

Aspect 62 can include or use, or can optionally be combined with the subject matter of one or any combination of Aspects 58 through 61 to optionally include or use wherein surrounding the reagent well with the isolation envelope includes nesting the reagent well within each of the at least one isolation wall and the at least one isolation cavity.

Aspect 63 can include or use, or can optionally be combined with the subject matter of one or any combination of Aspects 58 through 62 to optionally include or use wherein surrounding the reagent well with the at least one isolation wall includes surrounding the reagent well with at least first and second isolation walls, the second isolation wall is nested within the first isolation wall, and the reagent well is nested within the second isolation wall and the first isolation wall.

Aspect 64 can include or use, or can optionally be combined with the subject matter of Aspect 63 to optionally include or use wherein interposing the at least one isolation cavity includes: interposing a first isolation cavity between the first isolation wall and the second isolation wall and the reagent well, interposing a second isolation cavity between the second isolation wall and the reagent well, and the reagent well is nested within the first and second isolation walls and the first and second isolation cavities.

Aspect 65 can include or use, or can optionally be combined with the subject matter of one or any combination of Aspects 58 through 64 to optionally include or use wherein surrounding the reagent well with the isolation envelope includes filling the at least one isolation cavity with a desiccant.

Aspect 66 can include or use, or can optionally be combined with the subject matter of one or any combination of Aspects 58 through 65 to optionally include or use installing a plurality of the reagent cartridges within a cartridge magazine.

Aspect 67 can include or use, or can optionally be combined with the subject matter of Aspect 66 to optionally include or use wherein installing the plurality of reagent cartridges within the cartridge magazine includes: positioning each of the reagent cartridges of the plurality of reagent cartridges in a respective well socket of a magazine body, and engaging a cartridge profile of each reagent cartridge with a complementary profile well seat extending around each well socket.

Aspect 68 can include or use, or can optionally be combined with the subject matter of Aspect 67 to optionally include or use wherein the plurality of reagent cartridges include at least first and second reagent cartridges having respective first and second cartridge profiles, and the complementary profile well seats include first and second complementary profile well seats, and installing the plurality of reagent cartridges includes: engaging the first reagent cartridge profile with the first complementary profile well seat, and engaging the second reagent cartridge profile with the second complementary profile well seat, and the first reagent cartridge profile is incompatible with the second complementary profile well seat, and the second reagent cartridge profile is incompatible with the first complementary profile well seat.

Aspect 69 can include or use, or can optionally be combined with the subject matter of one or any combination of Aspects 66 through 68 to optionally include or use wherein installing the plurality of reagent cartridges within the cartridge magazine includes: positioning each of the reagent cartridges of the plurality of reagent cartridges along at least one complementary profile channel of the cartridge magazine, and each of the reagent cartridges are configured for dispensing through a dispensing port of the cartridge magazine.

Aspect 70 can include or use, or can optionally be combined with the subject matter of Aspect 69 to optionally include or use biasing the plurality of reagent cartridges toward the dispensing port with at least one biasing element.

Aspect 71 can include or use, or can optionally be combined with any portion or combination of any portions of any one or more of Examples 1 through 70 to include or use, subject matter that can include means for performing any one or more of the functions of Aspects 1 through 70, or a machine-readable medium including instructions that, when performed by a machine, cause the machine to perform any one or more of the functions of Aspects 1 through 70.

Each of these non-limiting aspects can stand on its own, or can be combined in various permutations or combinations with one or more of the other aspects.

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. A reagent cartridge comprising:
 a cartridge body configured to store a solid reagent, the cartridge body includes:
  a reagent well accessible through an access port, the reagent well includes a well sidewall and is configured to store the solid reagent; and
  a seal plate proximate the access port, the seal plate extends away from the access port to a seal plate edge remote from the access port; and
 an isolation envelope surrounding the reagent well, the isolation envelope includes:
  a seal membrane covering the access port, the seal membrane is fastened across the seal plate between the seal plate edge and the access port;
  first and second isolation walls; and
  first and second isolation cavities separated from the reagent well, wherein the first isolation cavity is interposed between the first isolation wall and the second isolation wall, and the second isolation cavity is interposed between the first isolation wall and the well sidewall.

2. The reagent cartridge of claim 1, wherein the isolation envelope includes a desiccant in at least one of the first isolation cavity or the second isolation cavity.

3. The reagent cartridge of claim 1, wherein the reagent well is nested within at least one of the second isolation wall and the first isolation cavity or the first isolation wall and the second isolation cavity.

4. The reagent cartridge of claim 1, wherein the isolation envelope includes an isolation membrane coupled with at least one of the first isolation wall or the second isolation wall and enclosing at least one of the first isolation cavity and the second isolation cavity.

5. The reagent cartridge of claim 1, wherein each of the first and second isolation walls and the first and second isolation cavities surrounds the reagent well.

6. The reagent cartridge of claim 1, wherein the reagent well is nested within each of the first and second isolation walls and the first and second isolation cavities.

7. The reagent cartridge of claim 1, wherein the isolation envelope includes an isolation membrane coupled with the first and second isolation walls and enclosing each of the first and second isolation cavities.

8. The reagent cartridge of claim 1, wherein the isolation envelope surrounding the reagent well includes the isolation envelope fully surrounding or partially surrounding the reagent well.

9. The reagent cartridge of claim 1, wherein a seal plate area of the seal plate is larger than an access port area of the access port.

10. The reagent cartridge of claim 1, wherein the cartridge body includes a cartridge profile configured for reception within a cartridge magazine.

11. The reagent cartridge of claim 10 comprising a cartridge magazine having a complementary profile to the cartridge profile, the cartridge profile is coupled with the complementary profile.

12. The reagent cartridge of claim 10, wherein the cartridge magazine includes a magazine tray, and the complementary profile includes a plurality of complementary profile seats configured for seating the cartridge profile.

13. The reagent cartridge of claim 10, wherein the cartridge magazine includes a magazine casing, and the complementary profile includes at least one complementary profile channel configured for slidable coupling with the cartridge profile.

14. A reagent cartridge comprising:
 a cartridge body configured to store a solid reagent, the cartridge body includes:
  a reagent well accessible through an access port, the reagent well includes a well sidewall and is configured to store the solid reagent; and
  a seal plate proximate the access port, the seal plate extends away from the access port to a seal plate edge remote from the access port;
 a seal membrane covering the access port, the seal membrane is fastened with the seal plate between the seal plate edge and the access port;
 a first isolation wall and a second isolation wall;
 a first isolation cavity and a second isolation cavity each separated from the reagent well, wherein the first isolation cavity is between the first isolation wall and the second isolation wall, and the second isolation cavity is between the first isolation wall and the well sidewall; and
 wherein the cartridge body includes a cartridge profile configured for complementary seating within a cartridge magazine.

15. The reagent cartridge of claim 14, wherein the cartridge profile includes one or more indexing features configured for coupling with a complementary profile of the cartridge magazine.

16. The reagent cartridge of claim 15 comprising:
 the cartridge magazine, the cartridge magazine having a plurality of reagent cartridges including the reagent cartridge and a plurality of reagent cartridges,
 wherein each of the reagent cartridges of the plurality of reagent cartridges includes the cartridge profile having the one or more indexing features in at least one indexing pattern, and
 wherein the complementary profile of the cartridge magazine includes a plurality of complementary profile seats, and one or more of the complementary profile seats is configured to seat at least one of the reagent cartridges having the one or more indexing features in the at least one indexing pattern.

17. The reagent cartridge of claim 16, wherein the at least one indexing pattern includes a plurality of indexing patterns,
 each of the reagent cartridges includes the cartridge profile having the one or more indexing features in an indexing pattern of the plurality of indexing patterns, each of the indexing patterns are different for each reagent cartridge, and
 each of the complementary profile seats are configured to seat reagent cartridges having one of the indexing patterns of the plurality of indexing patterns.

18. The reagent cartridge of claim 16, wherein the cartridge magazine includes a well plate frame.

19. The reagent cartridge of claim 15 comprising the cartridge magazine and a plurality of reagent cartridges having the cartridge profile,
  wherein the cartridge magazine includes a magazine casing having at least one complementary profile channel as the complementary profile, and the cartridge profiles of the plurality of reagent cartridges are seated and slidably coupled with the complementary profile channel.

20. The reagent cartridge of claim 14, wherein the cartridge body includes an anchor fitting configured to secure the cartridge body to the cartridge magazine.

21. The reagent cartridge of claim 14 comprising an isolation envelope surrounding the reagent well, the isolation envelope includes:
  the first isolation wall and the second isolation wall; and
  the first isolation cavity and the second isolation cavity.

22. The reagent cartridge of claim 21, wherein the isolation envelope includes the seal membrane.

23. The reagent cartridge of claim 21, wherein the reagent well is nested within at least one of the second isolation wall and the first isolation cavity or the first isolation wall and the second isolation cavity.

24. The reagent cartridge of claim 21, wherein the isolation envelope includes an isolation membrane coupled with at least one of the first isolation wall or the second isolation wall, and the isolation membrane encloses at least one of the first isolation cavity or the second isolation cavity.

* * * * *